US011044245B2

(12) United States Patent
Yamanakajima

(10) Patent No.: US 11,044,245 B2
(45) Date of Patent: Jun. 22, 2021

(54) SYSTEM AND CONTROL METHOD THEREFOR

(71) Applicant: CANON KABUSHIKI KAISHA, Tokyo (JP)

(72) Inventor: Kazunari Yamanakajima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 236 days.

(21) Appl. No.: 16/204,039

(22) Filed: Nov. 29, 2018

(65) Prior Publication Data
US 2019/0173877 A1 Jun. 6, 2019

(30) Foreign Application Priority Data

Nov. 30, 2017 (JP) .............................. JP2017-230834

(51) Int. Cl.
H04L 29/06 (2006.01)
H04L 9/32 (2006.01)

(52) U.S. Cl.
CPC ........ H04L 63/0853 (2013.01); H04L 9/3213 (2013.01); H04L 9/3247 (2013.01); H04L 63/0218 (2013.01); H04L 63/083 (2013.01); H04L 63/0807 (2013.01); H04L 63/123 (2013.01)

(58) Field of Classification Search
CPC ............. H04L 63/0853; H04L 63/0218; H04L 63/083; H04L 63/0807; H04L 63/123; H04L 9/3213; H04L 9/3247
USPC ........................................................... 726/6
See application file for complete search history.

(56) References Cited

U.S. PATENT DOCUMENTS

| 7,155,737 B1* | 12/2006 | Lim .................. G06F 21/33 726/2 |
| 9,886,222 B2* | 2/2018 | Sato ..................... G06F 3/1278 |
| 2004/0003287 A1 | 1/2004 | Zissimopoulos |
| 2014/0082715 A1* | 3/2014 | Grajek .................. G06F 16/955 726/8 |
| 2014/0189808 A1* | 7/2014 | Mahaffey ............ H04L 63/0853 726/4 |

(Continued)

FOREIGN PATENT DOCUMENTS

| EP | 2194482 A1 | 6/2010 |
| JP | 2015-5134 A | 1/2015 |
| WO | 2016/053964 A1 | 4/2016 |

OTHER PUBLICATIONS

Hakim. L. Fourar, "A Remote Authentication Model Using Smart Cards", CIS Lab, Prince Sultan University, Riyadh, P.O.Box 66833 Riyadh 11586, Saudi Arabia, 2006 IEEE GCC Conference (GCC) IEEE GCC Conference & Exhibition (Year: 2006).*

Primary Examiner — Khalil Naghdali
(74) Attorney, Agent, or Firm — Canon U.S.A., Inc., IP Division

(57) ABSTRACT

A system includes an authentication unit configured to authenticate the user based on the user information received at the access by the access unit, and a setting unit configured to set an authentication token indicating that the user has logged in and identification information indicating that the user has logged in via the integrated entrance server into cookie information on the web browser in response to a success in the authentication of the user by the authentication unit, and wherein a transition of the web browser in the system is controlled based on the cookie information on the web browser.

10 Claims, 17 Drawing Sheets

(56) References Cited

U.S. PATENT DOCUMENTS

2015/0067813 A1* 3/2015 Cha .................. G06F 21/57
                                                    726/10
2016/0021097 A1   1/2016 Shrotri
2016/0099924 A1* 4/2016 Mehta ............... H04L 67/10
                                                    726/7

* cited by examiner

Set-Cookie: auth=550e8400-e29b-41d4-a716-446655440000; expires=Wed, 15-Nov-2017 01:52:27 GMT

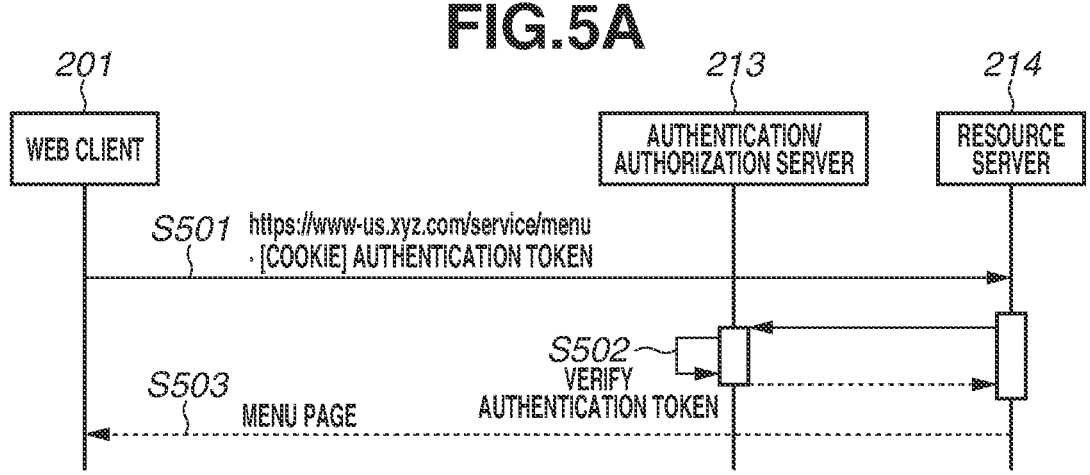
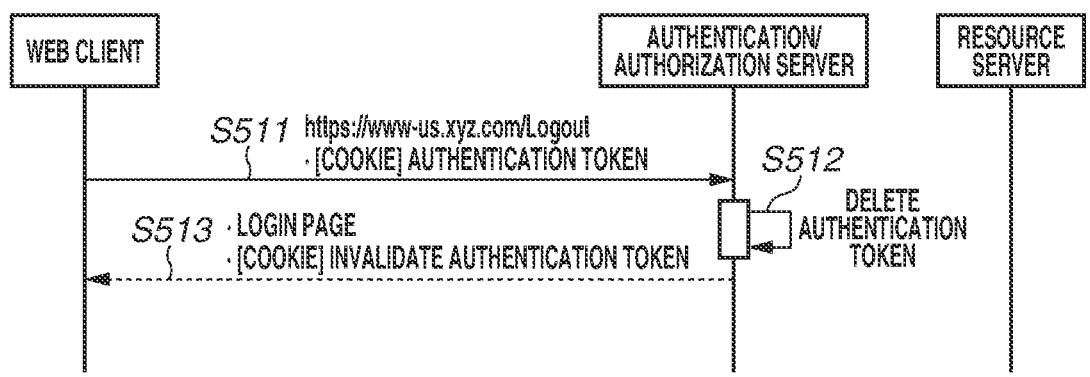
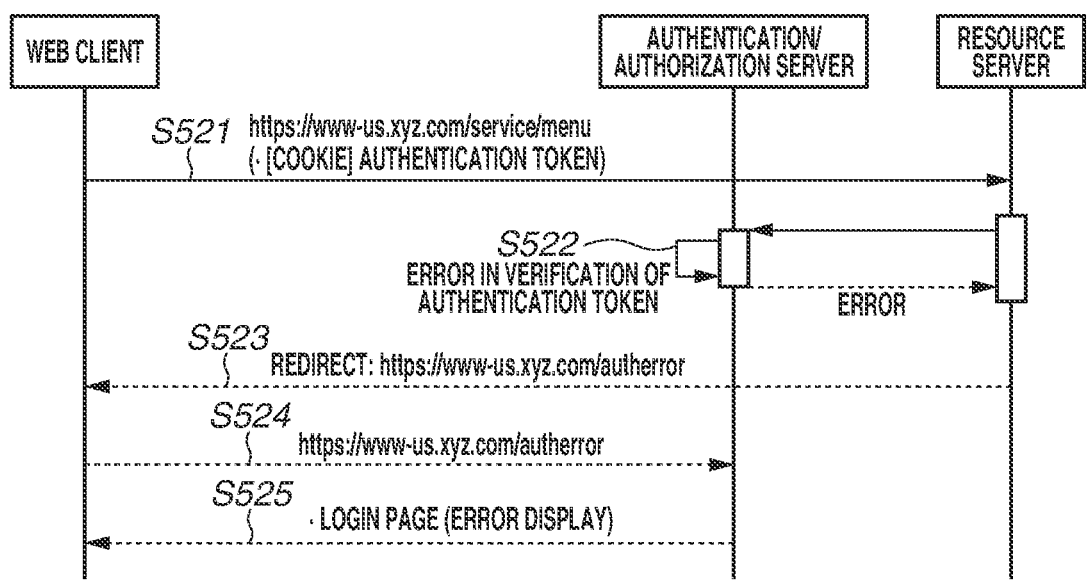

FIG.15

HEADER
{
  "alg": "RS256",
  "typ": "JWT"
}

PAYLOAD
{
  "iss": "https://www.xyz.com/",
  "sub": "https://www.xyz.com/",
  "aud": "https://www-us.xyz.com/",
  "exp": 1510561958,
  "iat": 1510561658,
  "userId": "user01"
  "password": "password01"
}

ENCODED
eyJhbGciOiJSUzI1NiIsInR5cCI6IkpXVCJ9···.(base64 encoded header).eyJpc3MiOiJjbGllbnQwMDEiLCJzdWIiOiJodHRwczovL3h4eC5j b20vIiwiYXVkIjoiaHR0cHM6Ly94eHguY29tL2F1dGhyaXphdGlvbiIsImV4 cCI6MTQ3MjcxMDQxMywiaWF0IjoxNDcyNzAwNDEzfQ···(base64 encoded payload).k_SbabNV···(Signature)

SYSTEM AND CONTROL METHOD THEREFOR

BACKGROUND OF THE INVENTION

Field of the Invention

The present invention relates to a system having a cloud authentication service and a control method therefor.

Description of the Related Art

In recent years, cloud services launched on the Internet have been becoming increasingly widely used. In such a cloud service, information technology (IT) apparatuses, such as a server and a network apparatus, are installed at a facility called a data center and centrally managed there, to provide a web application service to users. The data center is set up for each country or region, and a company providing the service worldwide allocates similar kinds of services at a plurality of data centers as needed. The data center that the users access is determined based on a region where the users are, a legal system, or a business content.

In terms of the allocated web application, the web application is provided via communication between a web server and a web client using the Hyper Text Transfer Protocol (HTTP) protocol, and the HTTP protocol is a so-called stateless protocol, meaning that processing is concluded by one communication action. The HTTP protocol cannot retain a user's state that is required for processing procedure of a workflow including a plurality of communication actions. Therefore, an HTTP cookie (hereinafter referred to as a cookie) has started to be used as a technique for retaining the state. The cookie is a communication protocol for managing the state between the web server and a web browser, and refers to information regarding the communication with the web server that the web browser stores in the web client. The cookie should be appropriately managed according to a configuration of the web server and based on a use method on the web client side. Japanese Patent Application Laid-Open No. 2015-5134 discusses a method for managing the cookie on the web client side.

As described above, in the case where the service is provided worldwide, the data center that the users access is determined based on the region where the users are or according to the legal system. Since the data center to be accessed is thus differed, different Uniform Resource Locators (URLs) are used for accessing a service site provided at a certain data center. Therefore, an integrated entrance site is sometimes provided to allow the users to access the service using a common URL.

This integrated entrance site plays a role of transferring access to a service allocated to the data center that the user uses, based on a request from the user. Further, the integrated entrance site and an entrance site provided for each of the data centers are individually prepared, and which entrance site is used for the access will be selectively determined according to the method used by the user. For example, in such a case that a bookmark of a page to be accessed is set to the web browser, a URL dependent on the site at each of the data centers may be set as the bookmark. Selecting the book mark will cause a transition and access to the entrance site at each of the data centers.

SUMMARY OF THE INVENTION

A system according to one aspect of the present invention for achieving an object is a system including a plurality of authentication servers each provided in a different one of regions, an integrated entrance server configured to provide a login page; and a client configured to include a web browser, wherein the integrated entrance server includes an identification unit configured to identify a region to which a user belongs, based on user information, in response to receipt of the user information input by the user via the login page from the web browser, and a transmission unit configured to transmit information regarding the region identified by the identification unit to the web browser, wherein the client includes an access unit configured to access one authentication server among the plurality of authentication servers provided in the regions, respectively, based on the information transmitted by the transmission unit, wherein the authentication server that has received the access by the access unit includes an authentication unit configured to authenticate the user based on the user information received at the access by the access unit, and a setting unit configured to set an authentication token indicating that the user has logged in and identification information indicating that the user has logged in via the integrated entrance server into cookie information on the web browser in response to a success in the authentication of the user by the authentication unit, and wherein a transition of the web browser in the system is controlled based on the cookie information on the web browser.

Further features of the present invention will become apparent from the following description of exemplary embodiments with reference to the attached drawings.

BRIEF DESCRIPTION OF THE DRAWINGS

FIGS. 5A, 5B, and 5C are diagrams each illustrating a sequence for accessing a server in a login state.

FIG. 15 is a diagram illustrating an example of the JWT issued in the integrated login using the JWT.

DESCRIPTION OF THE EMBODIMENTS

The above-described configuration leads to coexistence of the integrated entrance site and the entrance site for each of the data centers. As a consequence, it would be necessary to appropriately determine which site the web browser should transition to according to a situation during a processing procedure regarding authentication. The present invention is directed to solving the problem by controlling the transition of the web browser in the system based on the cookie information on the web browser.

Figure 1:
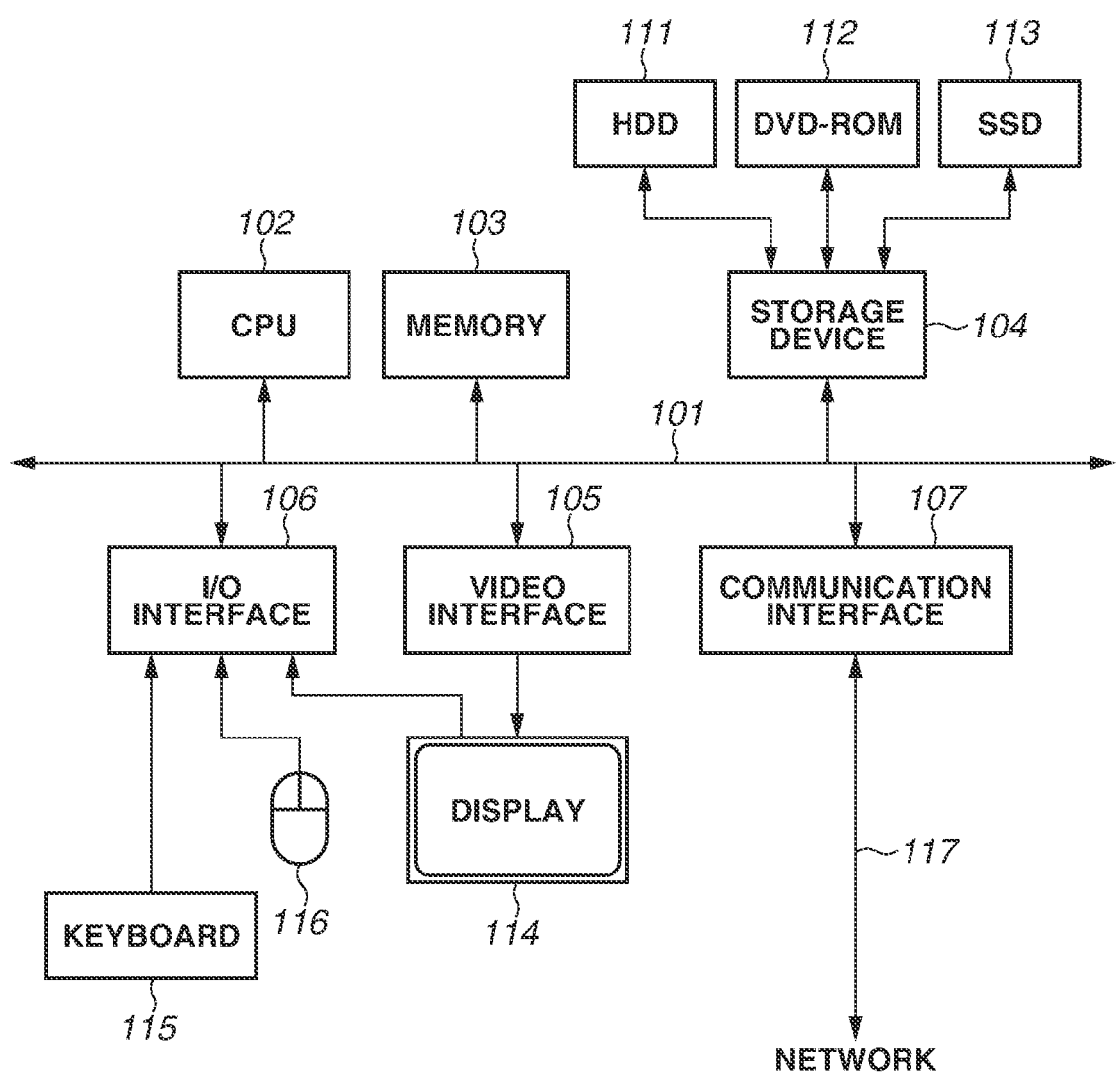
FIG. 1 is a diagram illustrating a configuration of a computer according to one exemplary embodiment of the present invention.

In the following description, exemplary embodiments for implementing the present invention will be described with reference to the drawings. FIG. 1 is a diagram illustrating a configuration of an information processing apparatus according to one exemplary embodiment for implementing the present invention. In FIG. 1, the information processing apparatus includes a central processing unit (CPU) 102, a memory 103, a storage device 104, a video interface 105, an input/output (hereinafter abbreviated as I/O) interface 106, and a communication interface 107. Further, the individual components in the information processing apparatus are connected to one another via a system bus 101. The CPU 102 is a central processing unit that controls each of the components via the system bus 101 and calculates and processes data.

The memory 103 is a device storing data and a program therein, and includes a random access memory (RAM) and/or a read only memory (ROM). The storage device 104 writes or reads stored data therein or therefrom. The storage device 104 includes a hard disk drive (HDD) 111, a digital versatile disk (DVD)-ROM drive 112 used as a nonvolatile data source, and a solid state drive (SSD) 113 using a semiconductor memory. Although being not illustrated in FIG. 1, devices that can be used as the storage device 104 include a magnetic tape drive, a floppy (registered trademark) disk drive (FDD), a compact disk (CD)-ROM drive, a CD/DVD-RAM drive, a universal serial bus (USB) flash drive, and the like.

A program regarding the present exemplary embodiment is executed by the CPU 102 after being read in from the storage device 104 and stored into the memory 103. In the present exemplary embodiment, the information processing apparatus is configured to read in the program from the storage device 104. Alternatively, the information processing apparatus may be configured to read in the program from the ROM (not illustrated) or from outside via the communication interface 107.

The video interface 105 controls a display output to a display device 114. The display device 114 use a method using, for example, cathode ray tube (CRT) and liquid crystal. An input device, such as a keyboard 115 and a pointing device 116, is connected to the I/O interface 106. An operator, for example, issues an operation instruction to the information processing apparatus by operating the keyboard 115. The pointing device 116 is used to, for example, select or operate a menu or an object by moving a cursor on the display device 114.

Further, possible examples of the display device 114 also include a device that allows an operation to be input via a touch panel or the like. In this case, the display device 114 can be served as both the output device and the input device. The communication interface 107 communicates with an external apparatus via a computer network 117. Examples of a network as a connection destination include a local area network (LAN), a wide area network (WAN), and a public communication line such as the Internet.

Figure 2:
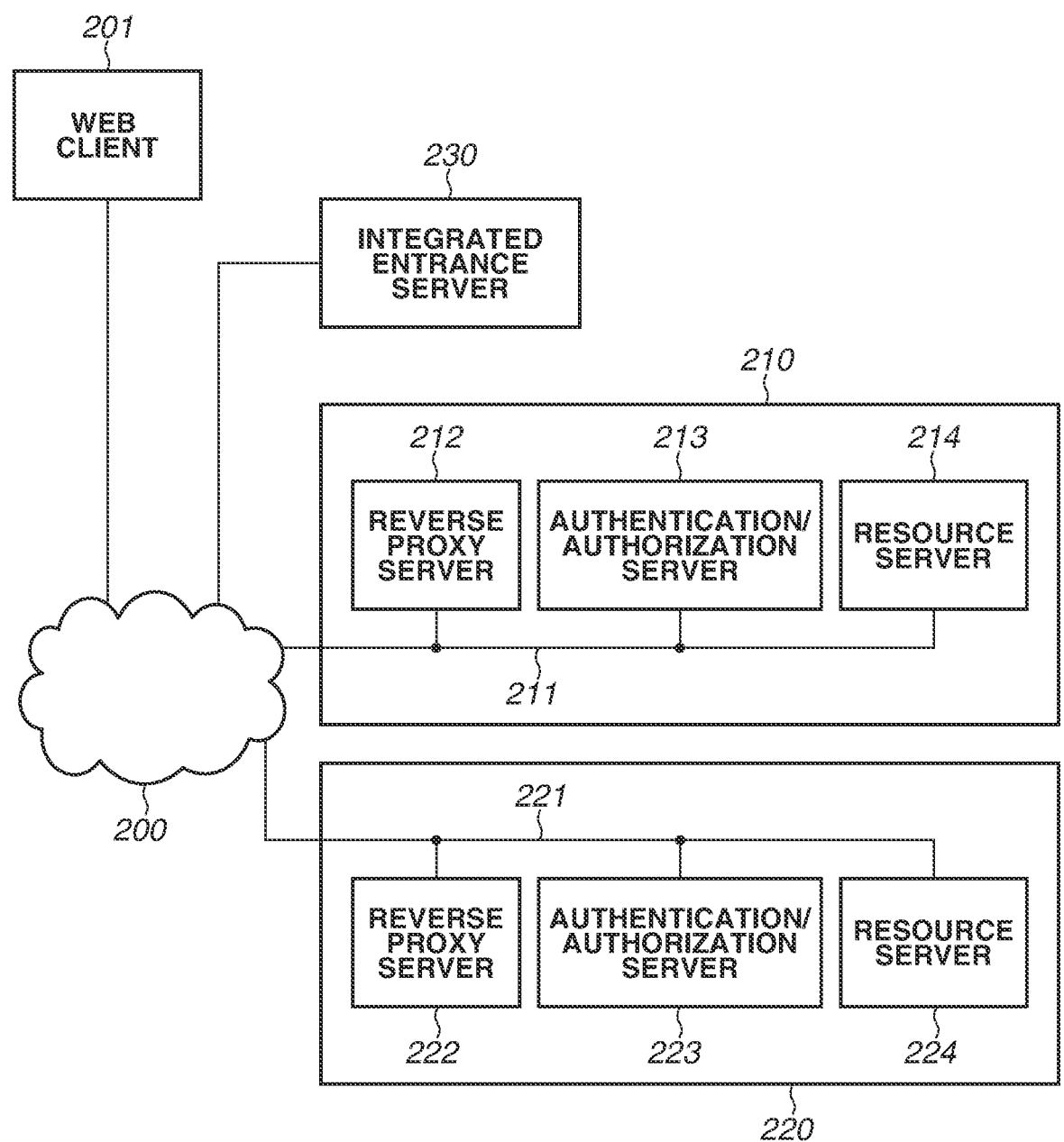
FIG. 2 is a diagram illustrating a network configuration according to the one exemplary embodiment of the present invention.

FIG. 2 is a diagram illustrating a network configuration according to the present exemplary embodiment. According to the exemplary embodiment, a client and servers illustrated in FIG. 2 each have the configuration of the apparatus illustrated in FIG. 1. However, the client and the servers are not limited to the configuration illustrated in FIG. 1, and may be an apparatus including another function or a rack-mounted system without being limited to a single computer. Further, in all of descriptions that will be described below, the CPU 102 serves as an agent of an action on the servers and the client, and the application program stored in the storage device 104 serves as an agent in terms of software, unless otherwise especially indicated.

The network configuration illustrated in FIG. 2 includes the Internet 200, and a web client 201 is connected to the Internet 200. The web client 201 is a client equipped with a web browser function, and can use a web technique, such as a cookie. The network configuration illustrated in FIG. 2 further includes a data center 210 and a data center 220 different from the data center 210. In the present example, for convenience of the description, each data center will be distinguished with use of an identification name based on a region where the data center is set up, and the data center 210 and the data center 220 will be referred to as a United States (US) region and a European (EU) region, respectively. A reverse proxy server 212, an authentication/authorization server 213, and a resource server 214 are connected to a computer network 211 in the US region 210. Further, a reverse proxy server 222, an authentication/authorization server 223, and a resource server 224 are connected to a computer network 221 in the EU region 220. The region is a term indicating some certain range like a country or an area, and a range of the region is not limited to any specific range.

Similar server configurations are included in the US region 210 and the EU region 220. The reverse proxy servers 212 and 222 each play a role of sorting a request from outside to a server inside the network 211 or 221. For example, the reverse proxy servers 212 and 222 determine whether to sort the request to the authentication/authorization server 213 or 223 or sort the request to the resource server 214 or 224 based on a path name in a URL. A different domain name specific to the US region 210 or the EU region 220 is assigned to each of the reverse proxy servers 212 and 222, and a domain name in the URL is also different therebetween. This means that access is separated region by region. Access from the web client 201 to the reverse proxy server 212 is sorted to the authentication/authorization server 213 and the resource server 214.

On the other hand, access to the reverse proxy server 222 is sorted to the authentication/authorization server 223 and the resource server 224. Further, because the reverse proxy servers 212 and 222 receive the request, the same domain name and the same domain are assigned to the authentication/authorization server 213 and the resource server 214.

Similarly, the same domain name and the same domain are also assigned to the authentication/authorization server 223 and the resource server 224. The authentication/authorization servers 213 and 223 each authenticate the request from the web client 201 and authorize processing. They may be an authentication/authorization server that performs only the authentication processing, and therefore the authentication/authorization server may be simply referred to as an authentication server for the sake of convenience. The resource servers 214 and 224 each provide a web application service within a range authorized by the authentication/authorization server 213 or 223.

An integrated entrance server 230 is a server prepared to receive a URL common worldwide. The integrated entrance server 230 may be provided at a data center other than the US region 210 and the EU region 220, or may be provided in the US region 210 or the EU region 220. Further, the present exemplary embodiment may be configured in such a manner that integrated entrance servers are provided at a plurality of data centers, and the common URL is assigned with use of Geo Domain Name System (GeoDNS) (not illustrated). GeoDNS is a mechanism that transfers a request to a server close to a client issuing the request from a viewpoint of a network. For example, when the web client 201 requests access to the common URL of the integrated entrance server, the request is transferred to the integrated entrance server provided in the US region 210 if a location where the web client 201 is disposed is close to the US region 210 from the viewpoint of the network.

Figure 3:
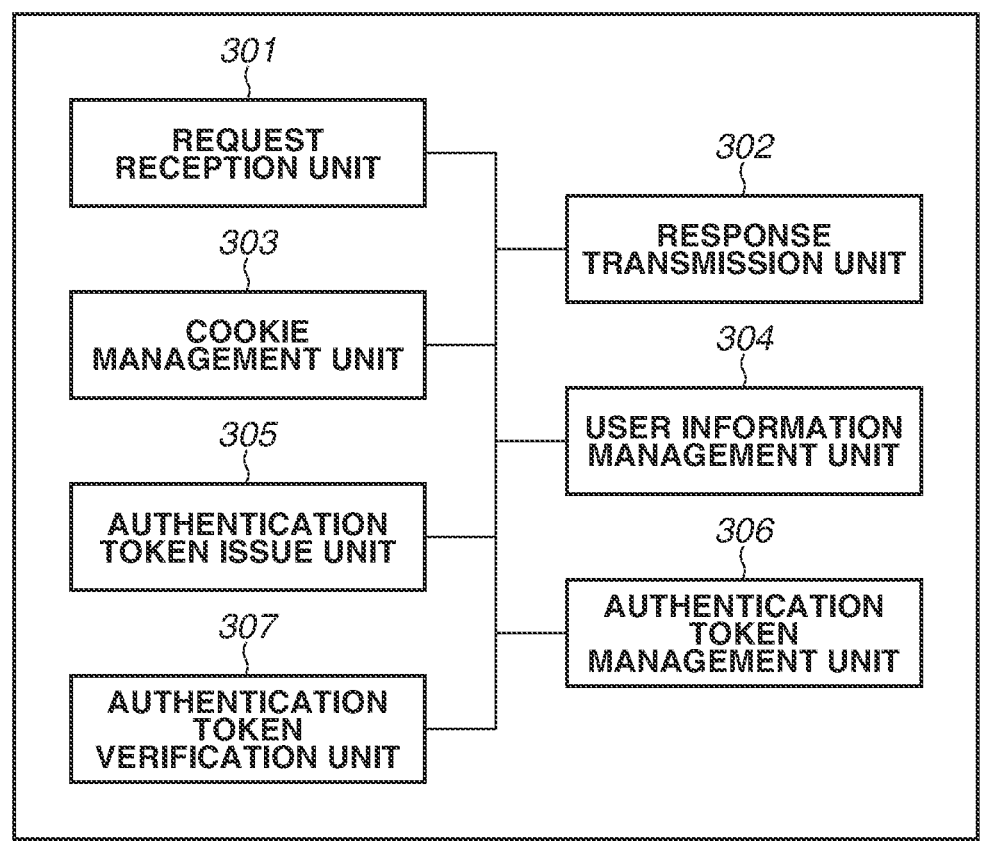
FIG. 3 is a functional block diagram illustrating an authentication/authorization server.

FIG. 3 is a functional block diagram of the authentication/authorization servers 213 and 223. A request reception unit 301 receives a request from a client or a server. A response transmission unit 302 returns a response to the client or the server according to a content received by the request reception unit 301. A cookie management unit 303 sets and acquires cookie information received or transmitted by the request reception unit 301 or the response transmission unit 302. A user information management unit 304 stores and manages registered user information. An authentication token issue unit 305 issues an authentication token. The authentication token is issued in association with the user information stored in the user information management unit 304. The authentication token management unit 306 stores and manages the authentication token issued by the authentication token issue unit 305. Further, the authentication token management unit 306 also deletes the authentication token that becomes unnecessary. An authentication token verification unit 307 compares a transmitted authentication token with the authentication token stored in the authentication token management unit 306, and verifies whether the authentication token is a validly issued token, i.e., the user is already authenticated.

A sequence in a case where the integrated entrance server 230 is not prepared will be described with reference to FIGS. 4A and 4B, and FIGS. 5A, 5B, and 5C. The sequence diagrams illustrated in FIGS. 4A and 4B and in the drawings subsequent thereto will be described, omitting the reverse proxy server 212 illustrated in FIG. 2. These sequence diagrams will be described as if the authentication/authorization server 213 and the resource server 214 are accessed directly from the web client 201, but, actually, they are accessed via the reverse proxy server 212.

Figures 4A, 4B:
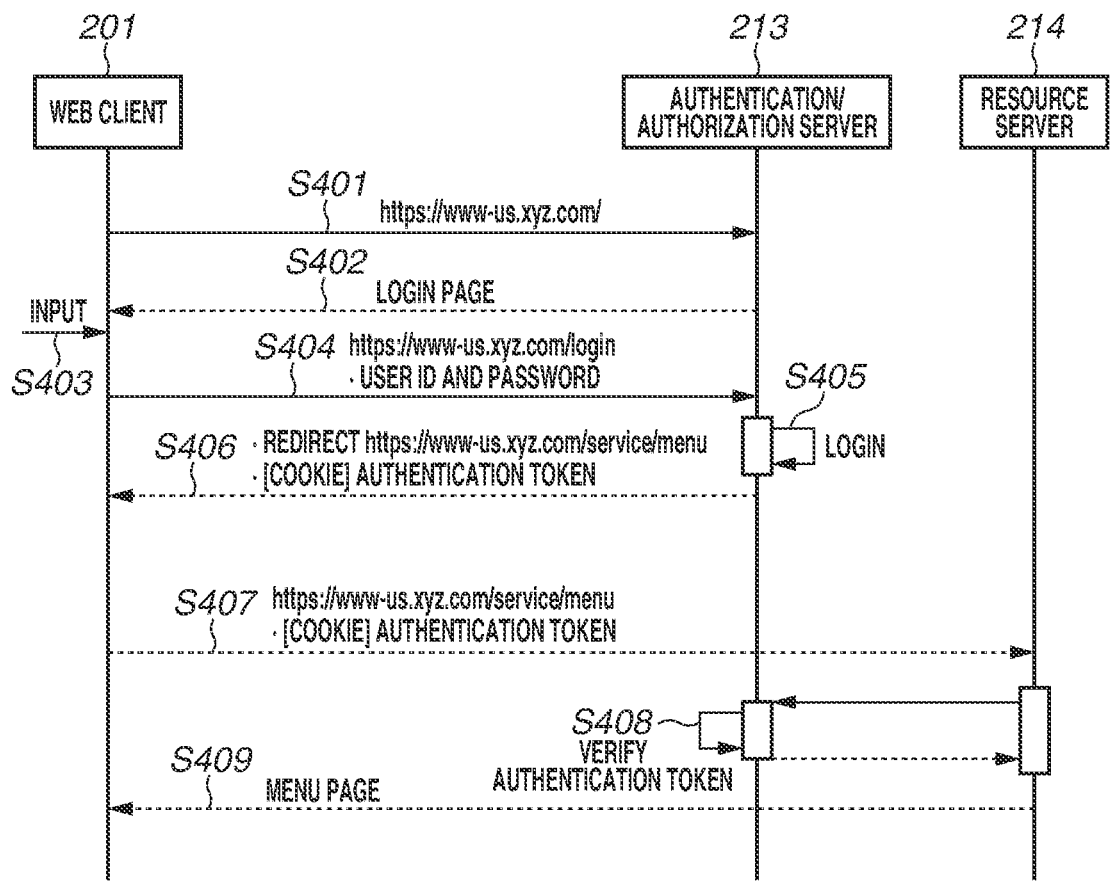
FIG. 4A is a sequence diagram illustrating a login sequence.
FIG. 4B illustrates an example of cookie information set by the authentication/authorization server.

FIG. 4A illustrates a conventional login sequence. In step S401, the web client 201 requests a login page to the authentication/authorization server 213 included in the US region 210. In step S402, the authentication/authorization server 231 sends the login page to the web client 201 as the response. In step S403, upon receipt of the login page, the web client 201 displays the login page on the display device 114, and the user using the web client 201 inputs a user identification (ID) and a password on the login page with use of the input device such as the keyboard 115 and the pointing device 116 and issues a login instruction.

In step S404, the web client 201 transmits a login request to the authentication/authorization server 213. At this transmission, the web client 201 also transmits the user ID and the password received from the user using the web client 201. A URL having the domain name specific to the US region 210 is set as a URL specified at the time of the login request in step S404. In step S405, upon receipt of the request, the authentication/authorization server 213 performs login processing. Details of the login processing will be described below in a description of FIG. 8. As the response to the login request, in step S406, the authentication/authorization server 213 sends, as a response, an instruction for redirection to a URL of a menu page that is a destination when the login is completed, and an instruction to set the authentication token into cookie information.

A web browser of the web client 201 locally stores the cookie received in step S406. FIG. 4B illustrates an example of the cookie information set by the authentication/authorization server 213 in step S406. The setting of the cookie information is specified in a Set-Cookie field of an HTTP header. A value set in an "auth" attribute in FIG. 4B is the authentication token, and the authentication token is an ID unique in the authentication/authorization server 213. Further, a value set in an "expires" attribute is an expiration date/time of the cookie, and the cookie that has passed the expiration date/time is prohibited from being transmitted from the web browser to the server according to the specifications. Further, a "domain" attribute is not specified in FIG. 4B, and the cookie is transmitted only to the domain of the server that has set the cookie information, i.e., www-us.xyz.com in the case of the illustrated example when the "domain" attribute is not specified according to the specifications.

Referring back to FIG. 4A, in step S407, the web client 201 is redirected to the redirection destination URL received in step S406, and also transmits the stored cookie information. Since the authentication/authorization server 213 and the resource server 214 are accessed via the same reverse proxy server 212, the web client 201 determines that the authentication/authorization server 213 and the resource server 214 belong to the domain of the same reverse proxy server 212, and transmits the cookie information. In step S408, the resource server 214 requests verification of the received authentication token to the authentication/authorization server 213, and the authentication/authorization server 213 verifies the authentication token. If the user is verified as being already authenticated, in step S409, the resource server 214 sends a menu page requested from the web client 201 as the response.

FIGS. 5A, 5B, and 5C are diagrams each illustrating a sequence of when the web client 201 accesses the authentication/authorization server 213 and the resource server 214 with the user logged in, i.e., the authentication token stored in the web client 201 as the cookie.

FIG. 5A is a sequence diagram when the web client 201 accesses the menu page, and illustrates the same processing from step S407 illustrated in FIG. 4A. The web client 201 accesses the menu page by being redirected in step S406 in FIG. 4A, but the access to the menu page is directly specified from the web client 201 in FIG. 5A.

In step S501, the web client 201 requests the access to the menu page, and also transmits the cookie information with the authentication token set therein that has been received and stored in step S406 to the resource server 214. In step S502, the resource server 214 requests the verification of the received authentication token to the authentication/authorization server 213, and the authentication/authorization server 213 verifies the authentication token. If the user is verified as being already authenticated, in step S503, the resource server 214 sends the menu page requested from the web client 201 as the response.

FIG. 5B illustrates a sequence diagram at the time of a logout. In step S511, the web client 201 transmits a logout request. In step S512, upon receipt of the request, the authentication/authorization server 213 deletes the authentication token stored in the authentication token management unit 306. In step S513, the authentication/authorization server 213 sets the expiration date/time of the cookie with the authentication token set therein again by changing the expiration date/time to a date and time earlier than the current date and time, and also sends the login page, which is a default page, as the response. The cookie with the authentication token set therein is invalidated because having passed the expiration date/time.

FIG. 5C illustrates a sequence diagram when the web client 201 attempts to access the menu page but an authentication error has occurred. Examples of cases in which the authentication error has occurred include when the cookie with the authentication token set therein has passed the expiration date/time, and when an authentication token not managed by the authentication token management unit 306 is transmitted. When the user has already logged out, this is also treated in a similar manner to when the cookie has passed the expiration date/time. In step S521, the web client 201 requests the access to the menu page, but the authentication token received in step S406 is not transmitted because it has passed the expiration date/time, or an authentication token not managed by the authentication token management unit 306 is transmitted.

In step S522, the resource server 214 requests the verification of the authentication token to the authentication/authorization server 213, but the authentication error has occurred on the authentication/authorization server 213 because there is no value of the authentication token or the authentication token is absent in the authentication token management unit 306. The present exemplary embodiment may be implemented in such a manner that the resource server 214 determines that the authentication error has occurred without requesting the verification of the authentication token to the authentication/authorization server 213 when the authentication token is not provided. In step S523, the resource server 214 sends a response while specifying an URL of an endpoint when the authentication error has occurred as the redirection destination. In step S524, the web client 201 is redirected to the endpoint specified in step S523. In step S525, the authentication/authorization server 213 sends a login page containing error information as the response.

As illustrated in FIGS. 4A and 4B, and FIGS. 5A, 5B, and 5C, storing the authentication token in the cookie allows the web client 201 to access the resource server 214 without the login processing performed each time access is attempted even when using the stateless HTTP protocol. Further, even at the time of the logout or when the authentication error has occurred, the web client 201 can return to the error page or the login page. FIGS. 4A and 4B, and FIGS. 5A, 5B, and 5C illustrate the processing procedures in the US region 210 illustrated in FIG. 2, and the processing is also performed according to similar sequences in the EU region 220.

Figure 6:
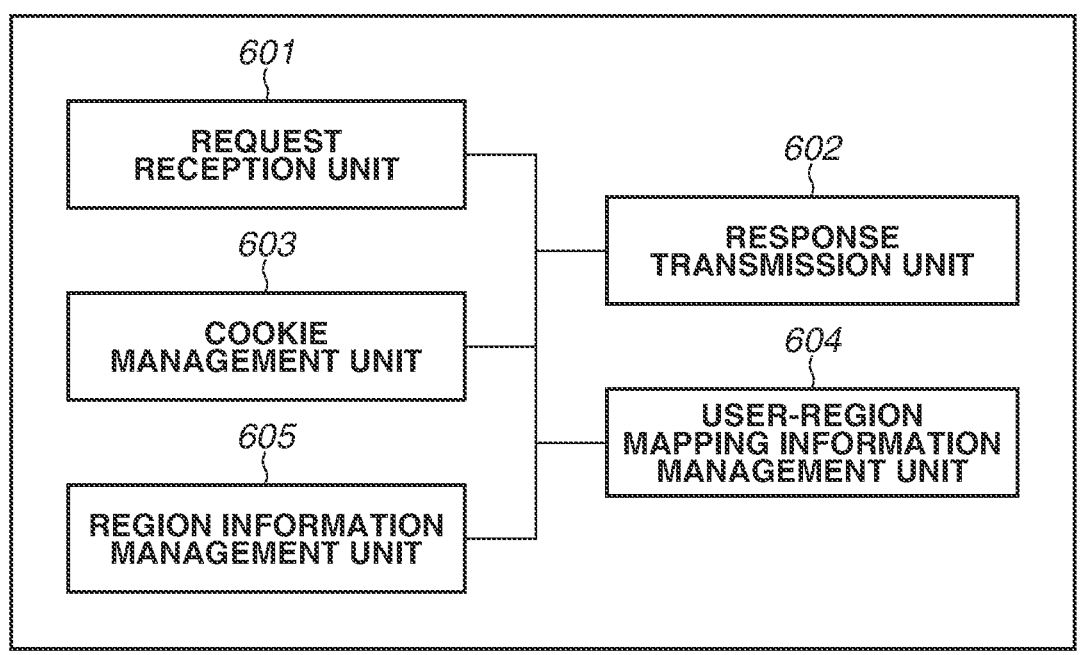
FIG. 6 is a functional block diagram illustrating an integrated entrance server.
Figure 7:
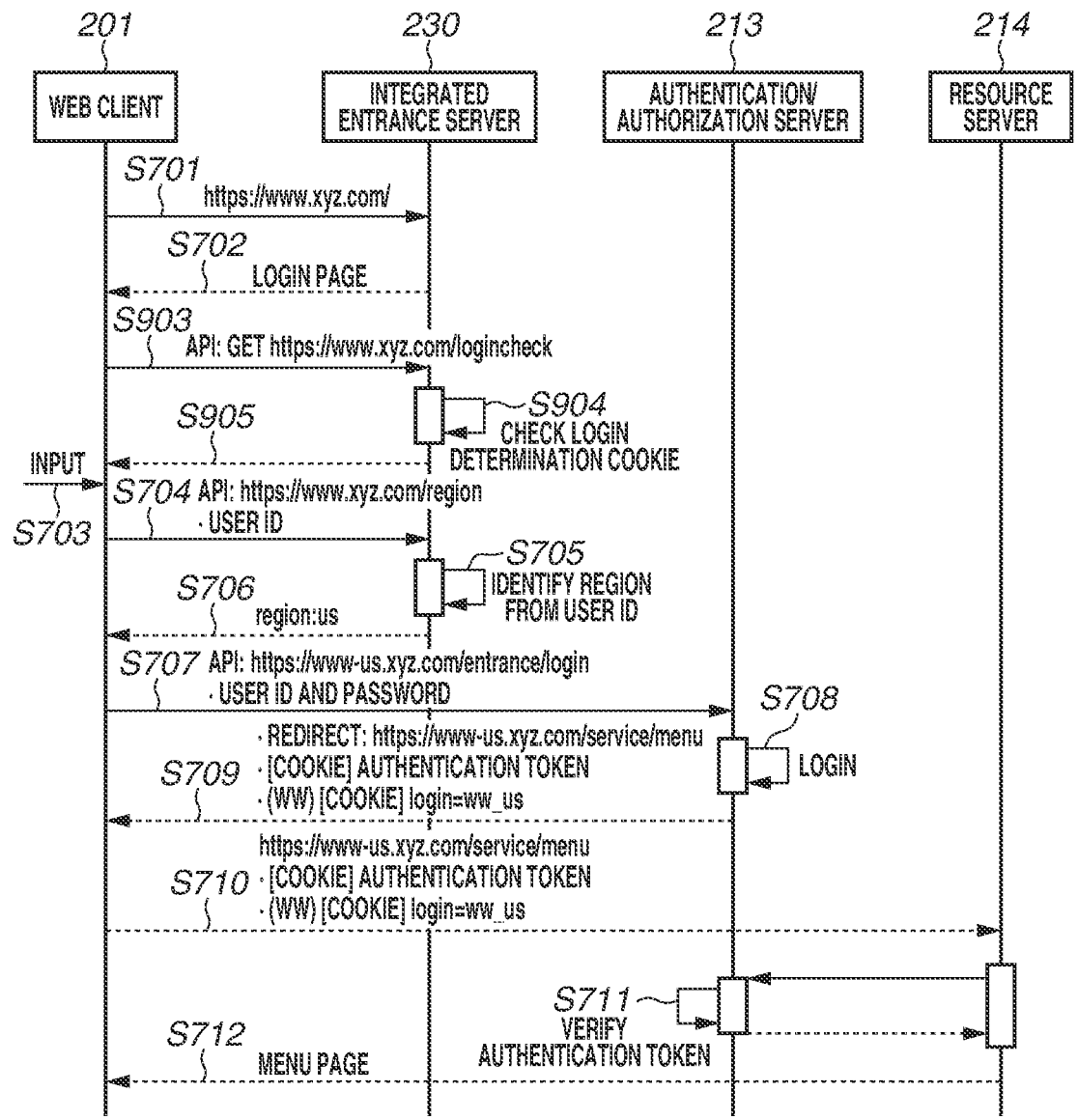
FIG. 7A is a sequence diagram illustrating an integrated login according to the one exemplary embodiment of the present invention.
FIG. 7B illustrates an example of the cookie information.

Next, a cloud authentication service via the integrated entrance server 230 will be described with reference to FIGS. 6 to 12. FIG. 6 is a functional block diagram of the integrated entrance server 230. A request reception unit 601 receives a request from a client or a server. A response transmission unit 602 sends a response to the client or the server according to a content received by the request reception unit 601. A cookie management unit 603 sets and acquires cookie information that is received or transmitted by the request reception unit 601 or the response transmission unit 602. A user-region mapping information management unit 604 manages mapping information between a hash value of an ID for a user belonging to each region and the region with which this user is registered. The hash value of the user ID is stored to protect personal information, as the user ID falls under the category of personal information. The user ID is set to a value unique worldwide. Further, the integrated entrance server 230 manages the mapping information in synchronization with the user information management unit 304 of the authentication/authorization server in each region.

In the example illustrated in FIG. 2, the user-region mapping information management unit 604 stores mapping information between each hash value in a list of user IDs stored in the user information management unit 304 of the authentication/authorization server 213 included in the US region 210, and the belongingness to the US region 210. Further, for the user ID stored in the user information management unit 304 of the authentication/authorization server 223 included in the EU region 220, the user-region mapping information management unit 604 also stores mapping information between each hash value in a list of user IDs and the belongingness to the EU region 220 in a similar manner With such a configuration, according to the information in the user-region mapping information management unit 604, the integrated entrance server 230 can determine which region the user ID belongs to. A region information management unit 605 manages information about the region covered by the cloud authentication service and information such as the domain name of the server provided in each region. A table 1 is an example of a mapping table between the user ID and the region.

TABLE 1

| user_id_hash | region |
| --- | --- |
| 085923d423abf2b7e9d9999432a3dcf0b5220e9ebbe31243aeb82b96e7ab2218 | us |
| b9ecd63773e95b533bbd6e700dce502eb7de4afd0f434f010387dc20bd852097 | us |
| 0550f0327ab8f2e6ea9b40281e11073bfac3ebd88c66dc0ada36645067a23304 | eu |

A user_id_hash column in the table 1 is the hash value of the user ID. As described above, the user ID may fall under the category of personal information, and therefore is stored after being converted into the hash value to prevent the user from being identified therefrom. When checking the user ID, the integrated entrance server 230 converts the received user ID into the hash value by the same method as the hash value stored in the mapping table, and then checks it. A region column indicates the region to which the user belongs.

FIG. 7A is a diagram illustrating a login sequence according to one exemplary embodiment of the present invention. In step S701, the web client 201 requests a login page to the integrated entrance server 230. In step S702, the integrated entrance server 230 sends the login page to the web client 201 as the response. According to the present exemplary embodiment, a URL of when the login page is requested to the integrated entrance server 230 in step S701 is a URL common worldwide, and is a URL usable without caring a change in the URL regardless which region the client is located in. In step S903, a script written in a Hyper Text Markup Language (HTML) of the login page runs on the web client 201 that has received the login page, and an application programming interface (API) for checking a login determination cookie toward the integrated entrance server 230 is executed. In step S904, upon receipt of this request, the integrated entrance server 230 checks the login determination cookie. As will be described in detail with reference to FIG. 9 below, the processing of steps S903 and S904 is processing for determining whether the user has already logged in, and the login processing is not performed yet in FIGS. 7A and 7B, so that a return value is not send in step S905.

Upon confirming that the user has not yet logged in, the web client 201 displays the login page on the display device 114. In step S703, the user using the web client 201 inputs the user ID and the password on the login page using the input device, such as the keyboard 115 and the pointing device 116, and issues a login instruction. Then, in step S704, the script written in the HTML of the login page runs on the web client 201, and the web client 201 executes an API for acquiring the region to which the user ID belongs toward the integrated entrance server 230.

In this processing, the user ID received from the user using the web client 201 is also transmitted to the integrated entrance server 230. Examples of a description of the script executing the API include "XMLHttpRequest.open ('POST', '/region', false);". In step S705, the integrated entrance server 230 calculates the hash value of the received user ID, and compares it in the user-region mapping information management unit 604 to identify the region to which the user belongs. Then, in step S706, the integrated entrance server 230 sends the region identified in step S705 to the web client 201 as the response. In step S707, the web client 201 issues a login request to a login API of a URL identified from the received region. In the example illustrated in FIG. 7A, the user belongs to the US region 210, and therefore the web client 201 transmits the login request to the login API of the authentication/authorization server 213 included in the US region 210.

A URL having the domain name specific to the US region 210 is set as the URL specified at the time of the login request in step S707. The script written in the HTML of the login page creates the URL from a combination with the region received in step S706. The present exemplary embodiment may be implemented in such a manner that the integrated entrance server 230 acquires the URL of the login API of the authentication/authorization server 213 from the region information management unit 605 based on the region identified in step S705, and transmits the URL in step S706. Further, in this processing, the user ID and the password received from the user using the web client 201 in step S703 are also transmitted.

In step S708, the authentication/authorization server 213 performs the login processing. Details of the login processing will be described below in the description of FIG. 8. In step S709, the authentication/authorization server 213 returns the instruction for redirection to the URL of the menu page that is the movement destination when the login is completed as a response. In this processing, the authentication token and identification information indicating that the user has logged in from the integrated entrance are set in the cookie information as a result of the login processing that will be described below. The web client 201 locally stores the two kinds of cookies received in step S709.

FIG. 7B illustrates an example of the cookie information set in step S709. In FIG. 7B, a cookie 721 is the cookie in which the authentication token is set, and is the same as the cookie illustrated in FIG. 4B. A cookie 722 is the cookie in which the identification information indicating that the user has logged in from the integrated entrance is set. In the cookie 722, "login" is a key name indicating that the user is in a login state, and a value "ww_us" thereof indicates that the user has logged in to the US region 210 via the integrated entrance. When the user has logged in from inside the US region 210 like the case illustrated in FIGS. 4A and 4B, a value "us" is set. A value set in a "domain" attribute indicates a transmission range of the cookie. In the login determination cookie 722, "xyz.com" is specified in the "domain" attribute, and this indicates that the cookie is transmitted to servers in xyz.com, which is a main domain, and all sub domains thereof. In other words, the cookie information is transmitted to all the servers located in the US region 210 and the EU region 220 illustrated in FIG. 2.

When the "domain" attribute is not specified like the authentication token cookie 721, the cookie is transmitted only to the domain of the server that has set the cookie, i.e., www-us.xyz.com in the illustrated example according to the specifications. In other words, only the login determination cookie 722 for determining that the user is in the login state is transmitted to the integrated entrance server 230. On the other hand, both the authentication token cookie 721 and the login determination cookie 722 are supposed to be transmitted to the authentication/authorization server 213 and the resource server 214, which are accessed via the reverse proxy server 212. A transmission range of the authentication token is not changed from the processing procedure illustrated in FIG. 4A, and therefore the present configuration does not lead to a reduction in security.

Referring back to FIG. 7A, in step S710, the web client 201 is redirected to the redirection destination URL received in step S709, and also transmits the cookie information received and stored in step S709. In step S711, the resource server 214 requests the verification of the received authentication token to the authentication/authorization server 213, and the authentication/authorization server 213 verifies the authentication token. If the user is verified as being already authenticated, in step S712, the resource server 214 sends the menu page requested from the web client 201 as the response. The sequence illustrated in FIG. 4A and the sequence illustrated in FIGS. 7A and 7B coexist together, and the web client 201 can also log in from the integrated entrance besides logging in from inside the region.

Figure 8:
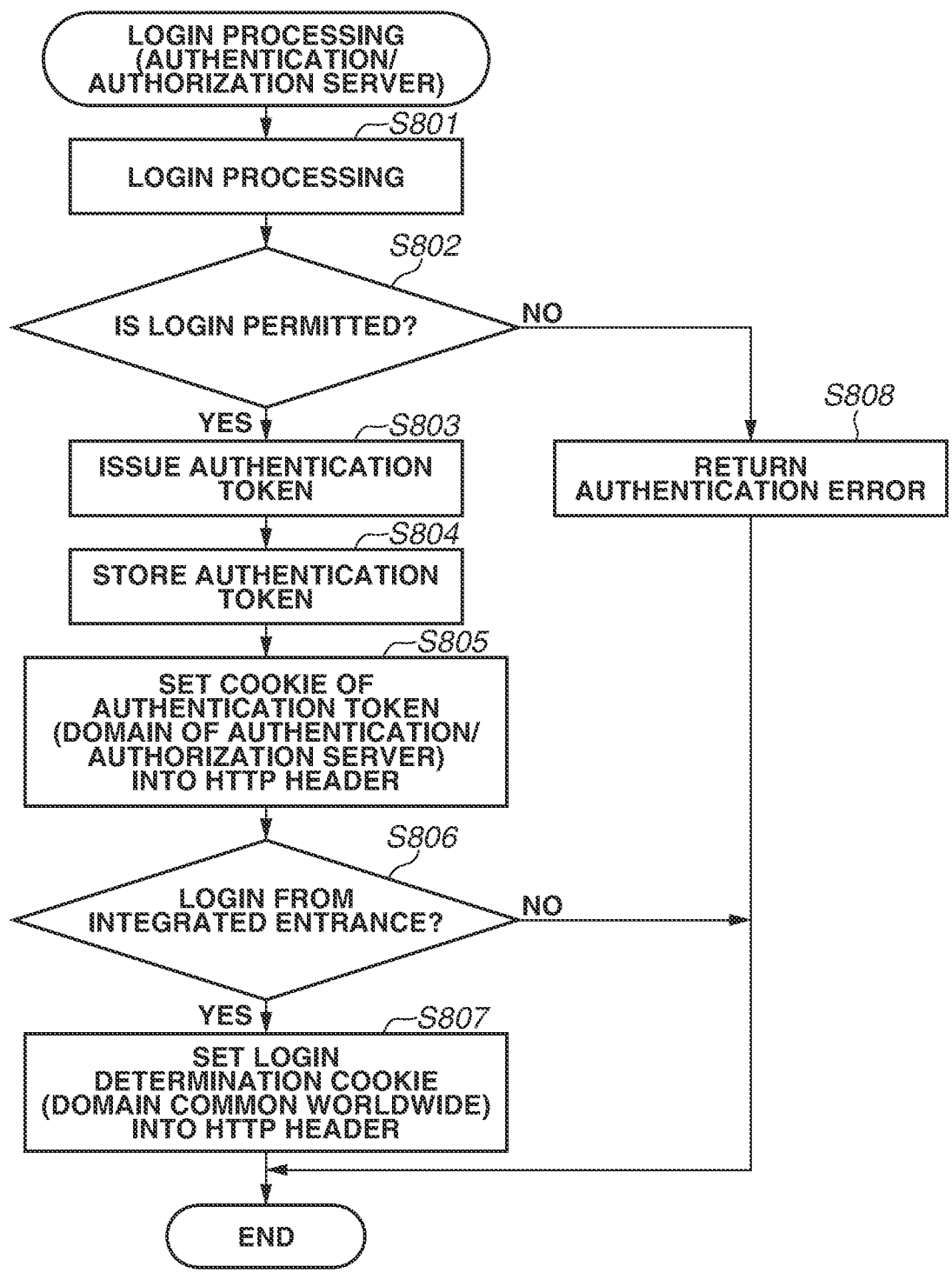
FIG. 8 is a flowchart illustrating a setting of a cookie at the time of login processing.

FIG. 8 is a flowchart of the login processing performed in step S708 illustrated in FIG. 7A. A program regarding the present flowchart is stored in the storage device 104 of the authentication/authorization server 213, and is read out into the memory 103 and executed by the CPU 102. First, in step S801, the authentication/authorization server 213 performs the login processing. More specifically, the request reception unit 301 receives the user ID and the password, and the user information management unit 304 checks the user information that the user ID and the password match. If there is the user information that the user ID and the password match, the authentication/authorization server 213 determines that the user is authenticated and permits the login. Then, in step S802, the authentication/authorization server 213 determines whether the login is permitted. If the login is permitted (YES in step S802), in step S803, the authentication token issue unit 305 issues the authentication token. In step S804, the authentication token management unit 306 stores the issued authentication token.

Further, in step S805, the cookie management unit 303 sets the issued authentication token as the Set-Cookie field in the response HTTP header. A specific method thereof is as indicated in 721 illustrated in FIGS. 7A and 7B. Then, in step S806, the request reception unit 301 determines whether the present login request is the login request from inside the US region 210 illustrated in FIGS. 4A and 4B or the login from the integrated entrance illustrated in FIGS. 7A and 7B. Possible methods for this determination include, for example, a method that determines it based on a difference in the URLs at which the request is received like between FIGS. 4A and 4B and FIGS. 7A and 7B, and a method that sets an attribute value for the determination in a case where the URLs are the same. One example of the latter method is a method that uses an Origin field in the HTTP header as the attribute value for the determination. The Origin field is a field according to the specifications of Cross-Origin Resource Sharing, and is a field set at the time of access to a different domain. The domain name "http://www.xyz.com/" of the integrated entrance server 230 is set in the Origin field due to the access from the login page of the integrated entrance server 230 to the authentication/authorization server 213, which is the different domain. On the other hand, at the time of access from the login page of the authentication/authorization server 213 to the same authentication/authorization server 213, the Origin field is not set, which allows the login to be determined about whether this login is the login from the integrated entrance.

If the present login is determined to be the login from the integrated entrance in step S806 (YES in step S806), in step S807, the cookie management unit 303 sets the cookie indicating that the user has logged in via the integrated entrance and having the information about the region to which the server belongs as the Set-Cookie field in the HTTP header. A specific content thereof is as indicated in the cookie 722 illustrated in FIG. 7B. If the login is not permitted in step S802 (NO in step S802), in step S808, the authentication/authorization server 213 sends a response of the authentication error.

Figure 9:
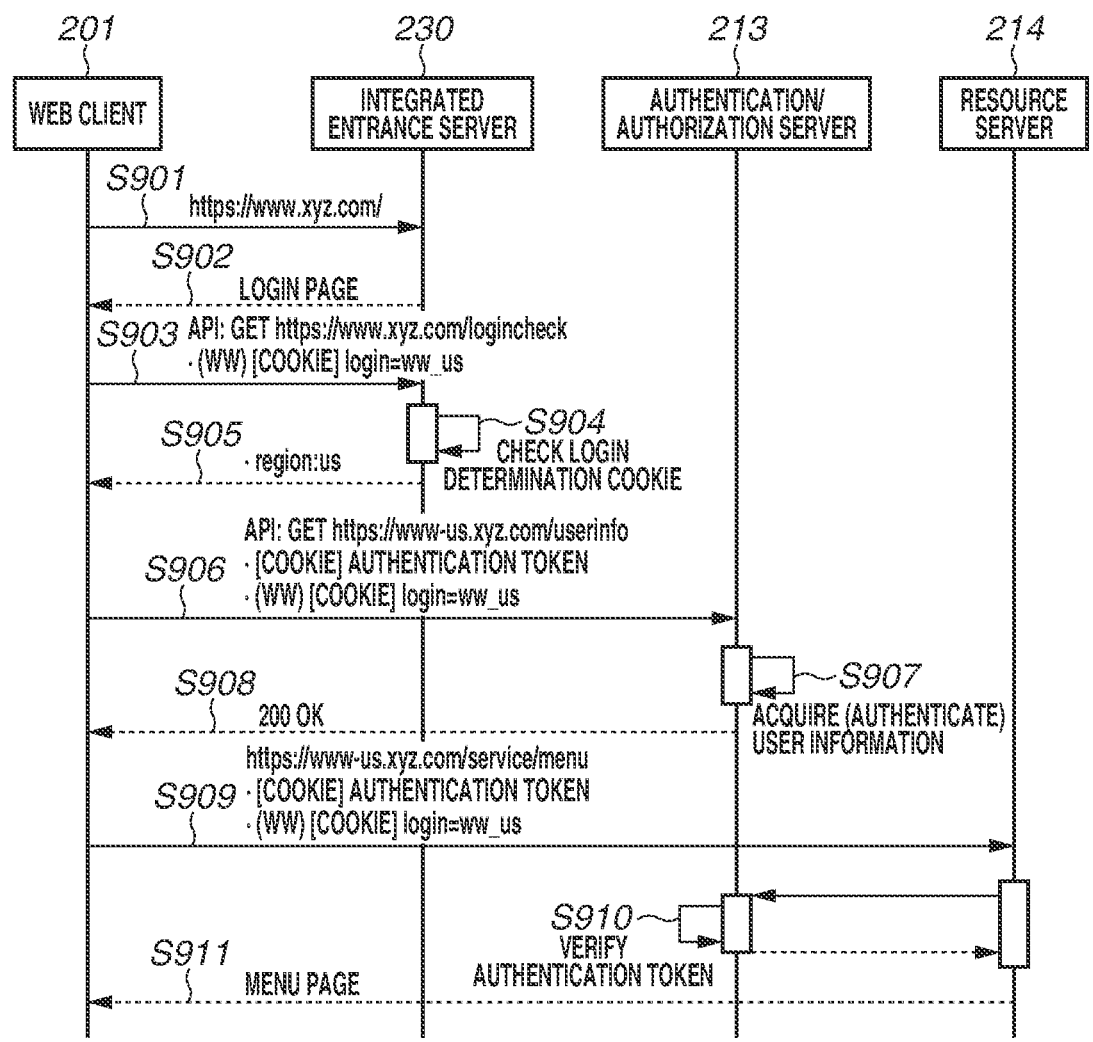
FIG. 9 is a diagram illustrating a sequence of when a web client accesses an integrated entrance in an integrated login state.

FIG. 9 is a sequence diagram when the web client 201 issues the login request to the integrated entrance with the user logged in from the integrated entrance, i.e., the authentication token cookie 721 and the login determination cookie 722 stored in the web client 201. In step S901, the web client 201 requests the login page to the integrated entrance server 230. In step S902, the integrated entrance server 230 returns the login page to the web client 201. In step S903, the script written in the login page runs on the web client 201 that has received the login page, and the web client 201 executes the API for checking the login determination cookie 722 toward the integrated entrance server 230. Further, along therewith, the web client 201 transmits the login determination cookie 722 received in step S709 illustrated in FIG. 7A.

In this processing, the authentication token cookie 721 is not transmitted to the integrated entrance server 230 since the transmission range thereof is limited to a server accessible via the reverse proxy server 212. In step S904, the integrated entrance server 230 checks the login determination cookie 722. In step S905, the integrated entrance server 230 sends the region information to the web client 201 as the response. A content of the check of the login determination cookie 722 will be described below. If the region information cannot be acquired, the login page is displayed as described with reference to FIGS. 7A and 7B, and the web client 201 is brought into a state waiting for the input of the user in step S703 illustrated in FIG. 7A.

Subsequently, in step S906, the web client 201 executes an API for confirming whether the authentication token has been issued toward the authentication/authorization server in the region received in step S905, i.e., the user is in the login state. This API may be dedicated for the check of the login, or this function may be instead realized by executing a user information acquisition API that acquires user information if the user is in the login state as illustrated. Further, along therewith, the web client 201 transmits the authentication token cookie 721 and the login determination cookie 722.

In step S907, the authentication/authorization server 213 verifies the authentication token and confirms that the user has already logged in. Upon this confirmation, in step S908, the authentication/authorization server 213 sends a success response. In step S909, upon receipt of the response indicating that the user is in the login state, the web client 201 requests the access to the menu page toward the region received in step S905. Further, along therewith, the web client 201 transmits the authentication token cookie 721 and the login determination cookie 722. In step S910, the resource server 214 requests the verification of the received authentication token to the authentication/authorization server 213, and the authentication/authorization server 213 verifies the authentication token. If the user is verified as being already authenticated, in step S911, the resource server 214 sends the menu page requested from the web client 201 as the response.

Figure 10:
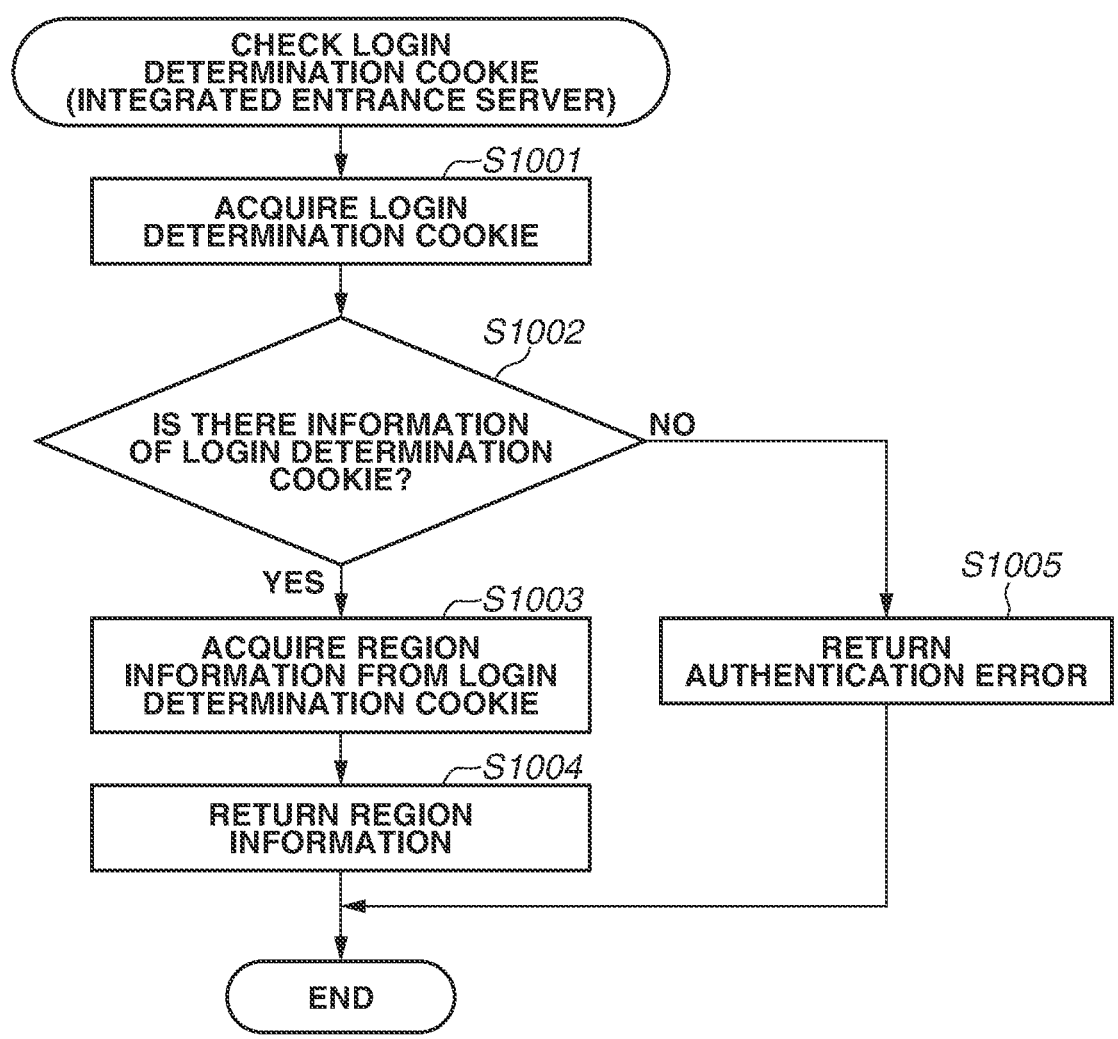
FIG. 10 is a flowchart illustrating a check of a login determination cookie.

FIG. 10 is a flowchart of the check of the login determination cookie 722 that is performed by the integrated entrance server 230 in step S904 illustrated in FIG. 9. A program regarding the present flowchart is stored in the storage device 104 of the integrated entrance server 230, and is read out into the memory 103 and executed by the CPU 102. In the integrated entrance server 230, in step S1001, the cookie management unit 603 acquires the login determination cookie 722. In step S1002, the cookie management unit 603 determines whether there is the login determination cookie 722. If there is the login determination cookie 722 (YES in step S1002), in step S1003, the cookie management unit 603 acquires the region information set in the value of the cookie 722. For example, the cookie management unit 603 acquires "us", which is the value of the login determination cookie 722 if the user has logged in from inside the US region 210, and acquires the region information by extracting the "us" portion indicating the region from the value "ww_us" if the user has logged in via the integrated entrance server 230. Then, after the region information management unit 605 checks the region information, in step S1004, the response transmission unit 602 sends the region information as the response. If the login determination cookies 722 cannot be acquired in step S1002 (NO In step S1002), this means that the user is not in the login state. Therefore, in step S1005, the integrated entrance server 230 sends the authentication error as the response.

Figure 11:
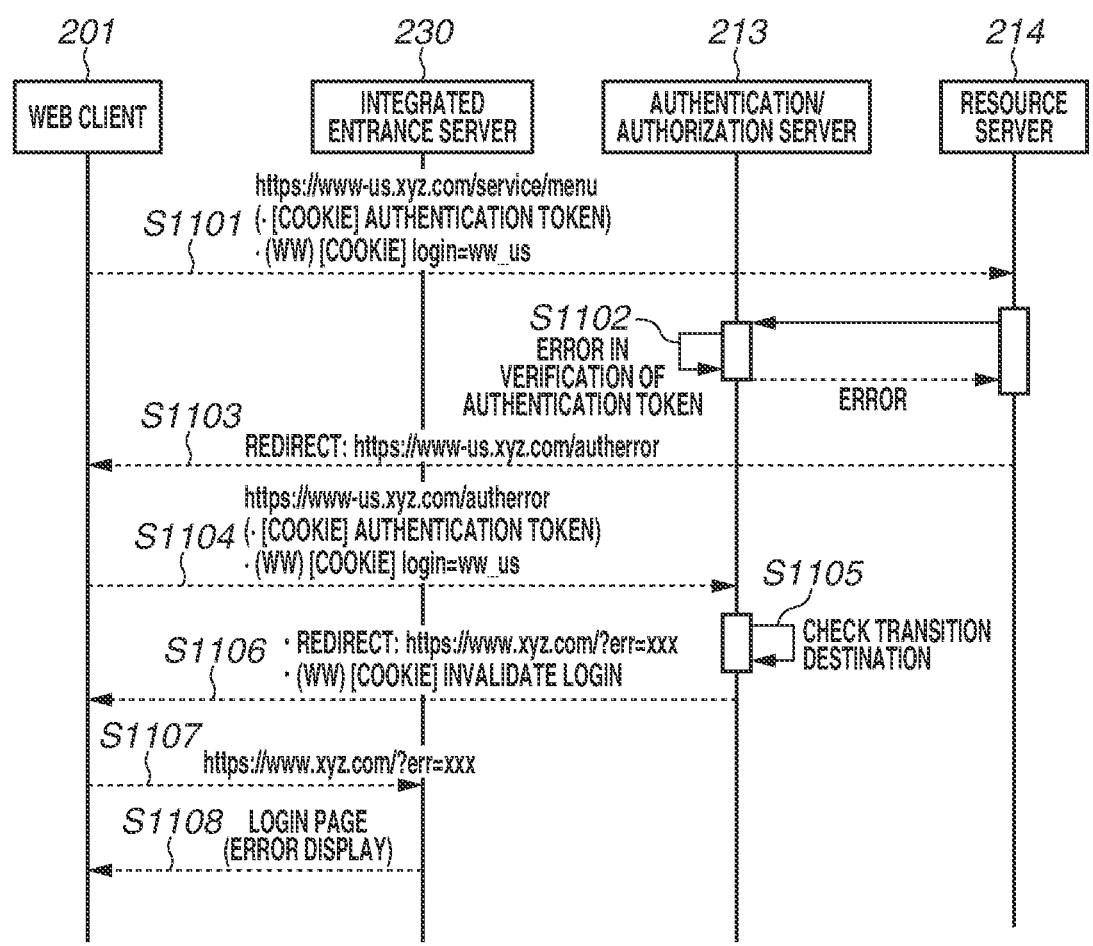
FIG. 11 is a diagram illustrating a sequence of when an authentication error has occurred in the integrated login state.

FIG. 11 is a sequence diagram when the web client 201 attempts to access the menu page but the authentication error has occurred with the user logged in from the integrated entrance, i.e., the authentication token cookie 721 and the login determination cookie 722 stored in the web client 201. Examples of cases in which the authentication error has occurred include when the cookie with the authentication token set therein has passed the expiration date/time, and when an authentication token not managed by the authentication token management unit 306 is transmitted, similarly to FIG. 5C. When the user is in an already logged-out state, this is also treated in a similar manner to when the cookie has passed the expiration date/time.

In step S1101, the web client 201 requests the access to the menu page toward the resource server 214, but the authentication token received in step S709 is not transmitted because it has passed the expiration date/time, or an authentication token not managed by the authentication token management unit 306 is transmitted. In step S1102, the resource server 214 requests the verification of the authentication token to the authentication/authorization server 213, but the authentication error has occurred on the authentication/authorization server 213 because there is no value of the authentication token or the authentication token is absent in the authentication token management unit 306. The present exemplary embodiment may be implemented in such a manner that the resource server 214 determines that the authentication error has occurred without requesting the verification of the authentication token to the authentication/authorization server 213 when the authentication token is not provided.

In step S1103, the resource server 214 sends the response while specifying the URL of the endpoint at the time of the authentication error as the redirection destination. In step S1104, the web client 201 is redirected to the endpoint at the time of the authentication error. Along therewith, the login determination cookie 722 is transmitted, but the authentication token is not transmitted because it has passed the expiration date/time, or an authentication token not managed by the authentication token management unit 306 is transmitted. In step S1105, the authentication/authorization server 213 confirms whether the user has logged in via the integrated entrance or logged in from inside the US region 210 (hereinafter referred to as a check of a transition destination). Details of the check of the transition destination will be described below, and the description of FIG. 11 will continue explaining the case in which the web client 201 has logged in via the integrated entrance. In step S1106, the authentication/authorization server 213 redirects the web client 201 after adding a query parameter for the error information to the login page of the integrated entrance, and also invalidates the login determination cookie 722. In step S1107, the web client 201 is redirected to the integrated entrance server 230. In step S1108, the integrated entrance server 230 sends the login page with the error information added thereto based on the query parameter as the response.

Figure 12:
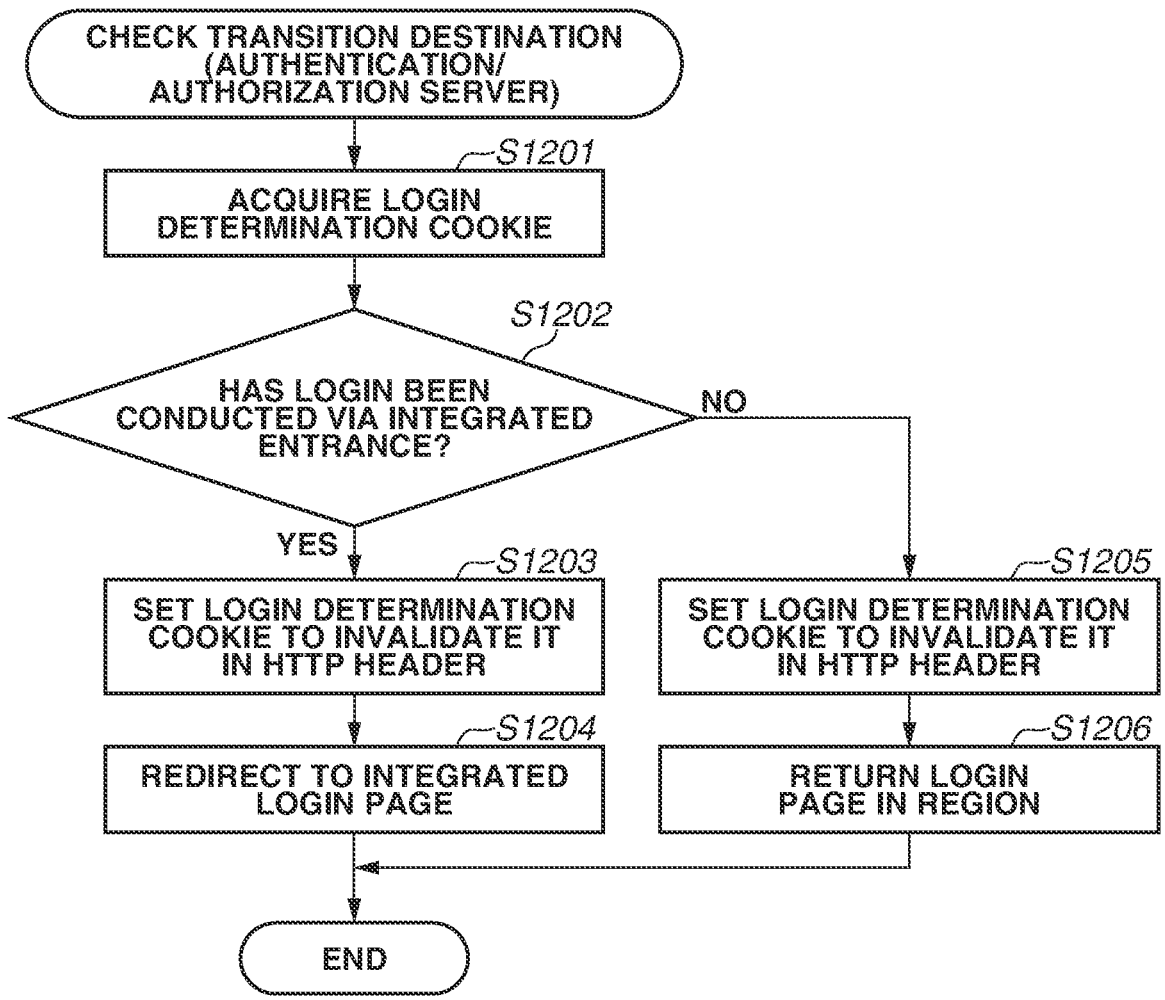
FIG. 12 is a flowchart illustrating a check of a transition destination.

FIG. 12 is a flowchart of the check of the transition destination that is conducted in step S1105 illustrated in FIG. 11. A program regarding the present flowchart is stored in the storage device 104 of the authentication/authorization server 213, and is read out into the memory 103 and executed by the CPU 102. In the authentication/authorization server 213, in step S1201, the cookie management unit 303 acquires the login determination cookie 722. In step S1202, the cookie management unit 303 determines whether the user has logged in via the integrated entrance or from inside the US region 210. For example, the cookie management unit 303 determines that the user has logged in via the integrated entrance if "ww" is added to the value of the login determination cookie 722, and determines that the user has logged in from inside the US region 210 if the value of the login determination cookie 722 contains only the region portion. If the user has logged in via the integrated entrance (YES in step S1202), in step S1203, the cookie management unit 303 sets the expiration date/time of the login determination cookie 722 again by changing the expiration date/time to a date and time earlier than the current date and time. Then, in step S1204, the response transmission unit 302 sends the redirection response after adding the query parameter of the error information to the login page of the integrated entrance. If the user is determined to have logged in from inside the US region 210 in step S1202 (NO in step S1202), in step S1205, the authentication/authorization server 213 invalidates the login determination cookie 722 similarly to step S1203. In step S1206, the response transmission unit 302 sends a response after adding the error information to the login page in the US region 210.

In this manner, as described with reference to FIGS. 6 to 12, the present exemplary embodiment enables the transition to be appropriately controlled depending on when the user has logged in from the integrated entrance and when the user has logged in from inside the region. Further, the present exemplary embodiment can also lead to the prevention of the reduction in the security by setting the authentication token and the identification information at the time of the login via the integrated login while selectively using the different settings for the domain attribute of the cookie. FIGS. 6 to 12 illustrate the processing procedure in the case where the web browser transitions to the US region 210, and this processing is also performed according to similar sequences even in a case where the web browser transitions to the EU region 220.

Next, processing in a case where a detailed error display is presented in step S1108 in the sequence illustrated in FIG. 11 will be described with reference to FIG. 13. In some cases, the personal information such as the user ID may be displayed on the error display. However, the error page is created by the integrated entrance server 230, which is the redirection destination, so that the information cannot be retained in session of the authentication/authorization server 213 like the conventional case illustrated in FIGS. 4A and 4B and FIGS. 5A, 5B, and 5C. Further, the cookie should neither be stored in light of the protection of the personal information because the transmission range thereof may spread and expand across national borders. One attempt to deal with this concern is to store the personal information in Web Storage in advance, and cause the web client 201 to arrange the error information to be displayed by the script and output it when the error has occurred, and this example will be described now.

Figure 13:
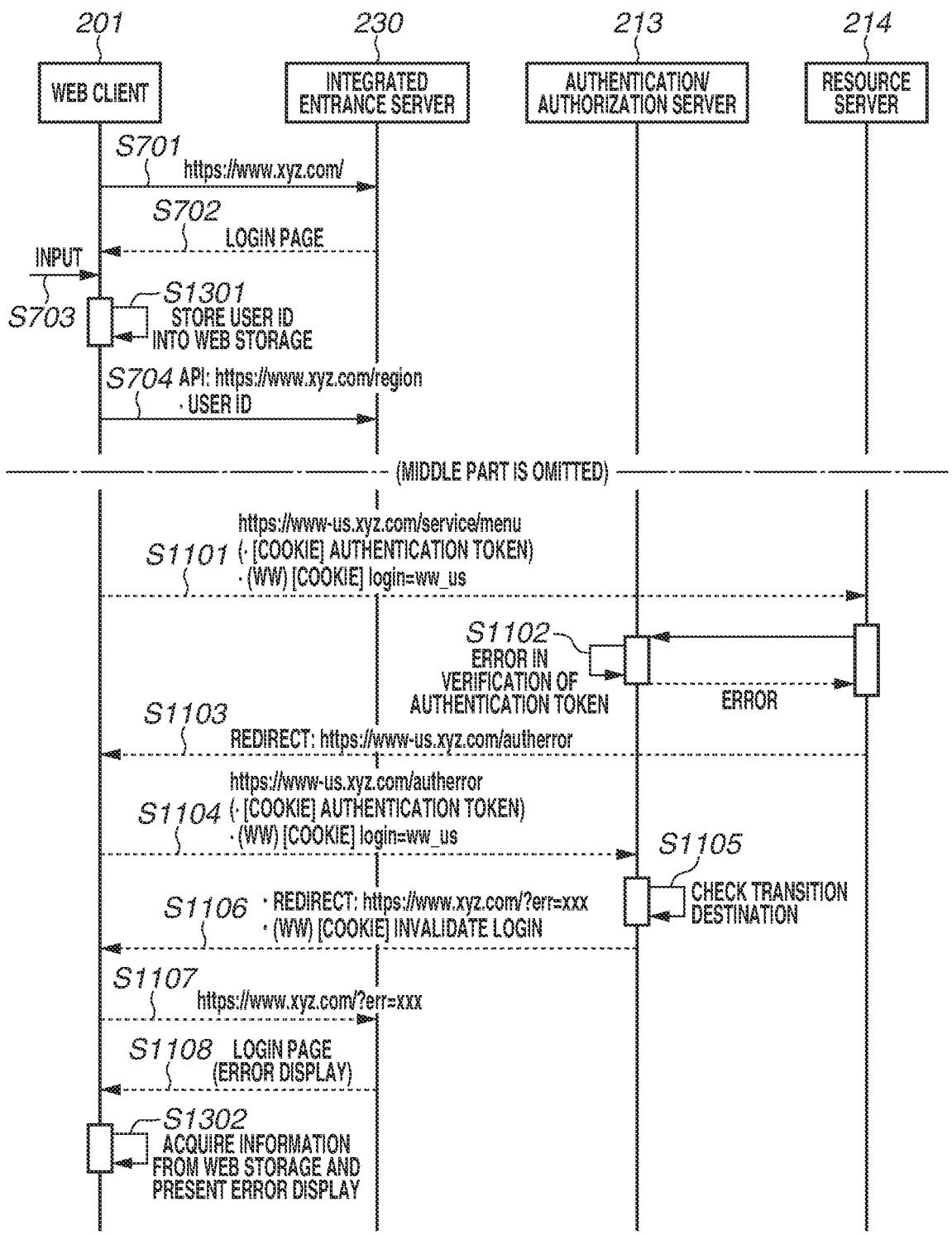
FIG. 13 is a diagram illustrating a sequence of when a detailed error is displayed at the time of the authentication error.

FIG. 13 illustrates processing in a case where the user has logged in from the integrated entrance server 230 as illustrated in FIG. 7A and the authentication error illustrated in FIG. 11 has occurred. In FIG. 13, the processing from steps S701 to S703 is performed in a similar manner to FIG. 7A. Next, in step S1301, the web client 201 stores the user ID into Web Storage when the user using the web client 201 enters the input in step S703. As the processing for the storage, the script written in the HTML of the login page returned in step S702 acquires the user ID input on the page and stores the acquired user ID with use of a method for storing it into Web Storage. Examples of the storage method include "sessionStorage.setItem('userId', userID);". A first argument "'userId'" indicates a key name when the user ID is stored into Web Storage, and a second argument "userId" indicates a variable where the user ID input on the login page is stored.

The login processing of step S704 and the steps subsequent thereto is similar to FIG. 7A, and therefore a description thereof will be omitted here. After that, in steps S1101 to S1108, the menu page is requested, the authentication error has occurred, the web client 201 is redirected to the integrated entrance server 230, and the login page containing the error display is send as the response, similarly to FIG. 11. In step S1302, the script written in the HTML of the login page returned in step S1108 is executed on the web client 201, and acquires the user ID stored in Web Storage in step S1301 and displays it on the displayed error information. Examples of a method for acquiring the user ID from Web Storage include "sessionStorage.getItem('userID');". A first argument "'userId'" indicates the key name of the information to be acquired from Web Storage.

Figure 17:
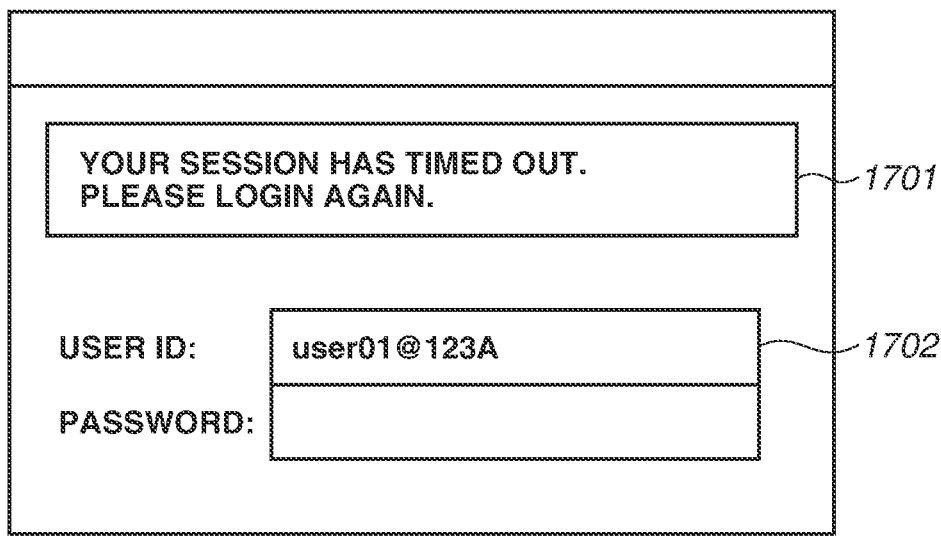
FIG. 17 is a diagram illustrating a screen on which the authentication error is displayed.

FIG. 17 illustrates an example of the error display described in the description of step S1302 illustrated in FIG. 13. The error display contains an error message 1701. The integrated entrance server 230 receives the error information transmitted by the authentication/authorization server 213 in step S1106 illustrated in FIG. 13 via step S1107, and embeds it into the HTML of the login page as the message in step S1108, by which the error message 1701 is acquired. Further, a plurality of candidates for the error message may be embedded in the HTML in advance, and the script written in the HTML of the login page may select the error message based on the information acquired from Web Storage. For example, in the example illustrated in FIG. 17, in step S1106, the authentication/authorization server 213 sends error information indicating that the user is not in the login state, as the response. In step S1302, the web client 201 can determine that the user had logged in immediately before that due to the user ID stored in Web Storage, and therefore displays a message prompting the user to log in again. A user ID 1702 is the user ID when the user had logged in immediately before that, and is the value acquired from Web Storage in step S1302 illustrated in FIG. 13. In this manner, the present exemplary embodiment allows the error to be displayed while preventing the reduction in the security by using a storage location while selecting and combining it according to the information to be stored.

Second Exemplary Embodiment

The first exemplary embodiment is implemented so as to use the APIs in steps S704 and S707 in the processing for the login from the integrated entrance server 230 described with reference to FIGS. 7A and 7B, but some of old web browsers cannot call an API using a script. A second exemplary embodiment will be described as an exemplary embodiment for achieving the processing for the login from the integrated entrance server 230 even in a case where such an old web browser is in use.

Figure 14:
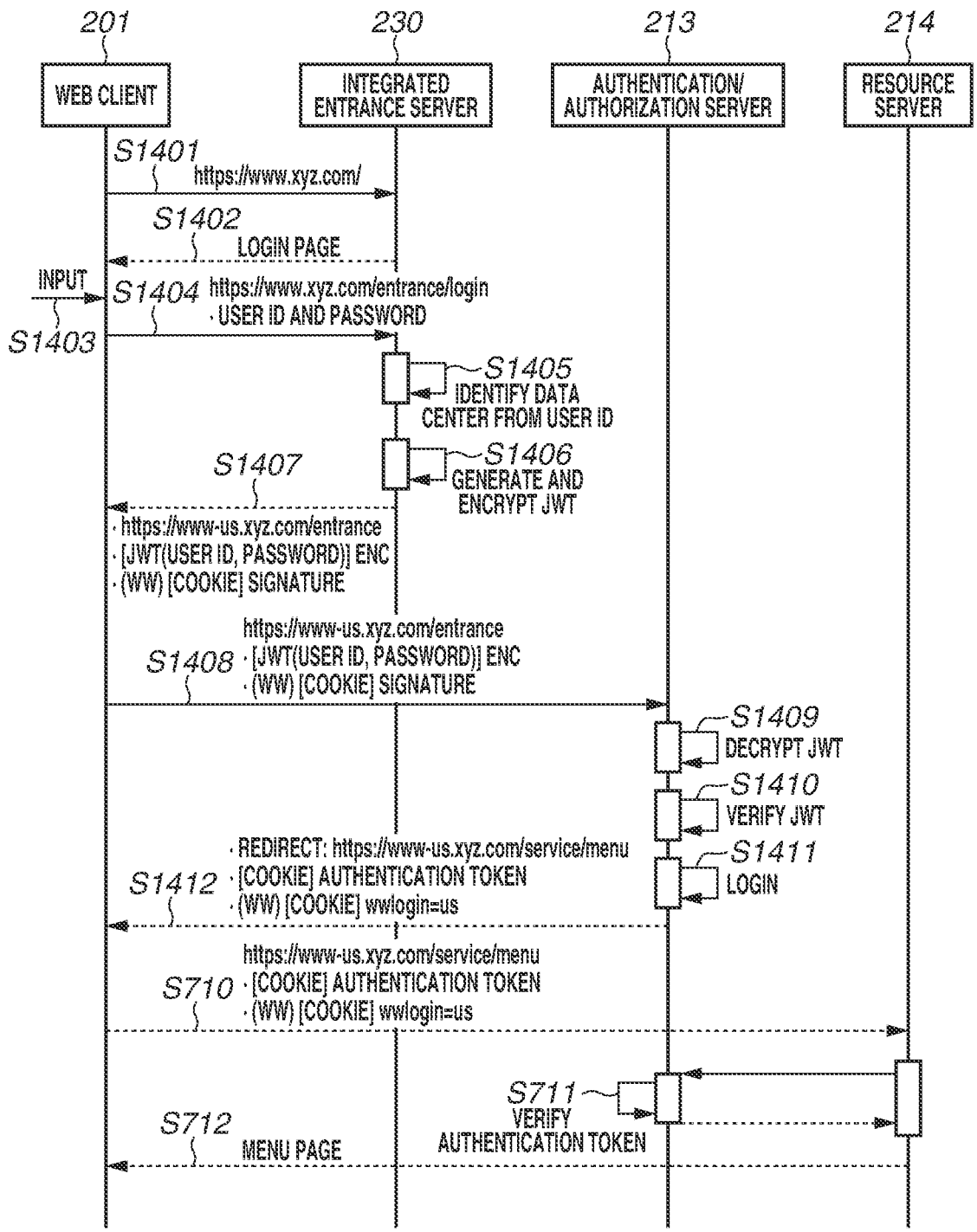
FIG. 14 is a diagram illustrating a sequence of an integrated login using a JavaScript Object Notation (JSON) Web Token (JWT).

In FIG. 14, in step S1401, the web client 201 requests the login page to the integrated entrance server 230. In step S1402, the integrated entrance server 230 sends the login page to the web client 201 as the response. A URL common worldwide is set as the URL when the login page is requested in step S1401. Further, the HTML of the login page returned in step S1402 has a different content from the content in step S702 illustrated in FIG. 7A according to the first exemplary embodiment, and the script that executes the API is not written therein like steps S903, S704, and S707 illustrated in FIG. 7A.

Upon receipt of the login page, the web client 201 displays the login page on the display device 114. In step S1403, the user using the web client 201 inputs the user ID and the password on the login page using the input device such as the keyboard 115 and the pointing device 116, and issues the login instruction. In step S1404, the web client 201 transmits the login request to the integrated entrance server 230. In this processing, the web client 201 also transmits the user ID and the password received from the user using the web client 201 in step S1403.

In step S1405, the integrated entrance server 230 calculates the hash value for the received user ID, and the user-region mapping information management unit 604 identifies the region to which the user belongs. Then, in step S1406, the integrated entrance server 230 generates request information in a JavaScript Object Notation (JSON) Web Token (JWT) format to issue the login request to the authentication/authorization server 213. The JWT contains the user ID and the password received from the web client 201. Details of the content of the JWT will be described below. Further, a digital signature is added to the JWT, and a header section and a payload section in the JWT are encrypted. A secret key of the integrated entrance server 230 is used for the digital signature, and a common key is used for the encryption. A key pair of a public key and the secret key is generated in the integrated entrance server 230 in advance, and the public key is distributed to the authentication/authorization server 213. Further, the common key is distributed to the servers in the present system, such as the integrated entrance server 230 and the authentication/authorization server 213.

In step S1407, the integrated entrance server 230 sends the URL of the transition destination and the encrypted JWT to the web client 201 as the response, and sets the digital signature of the JWT into the cookie. The domain name of the transition destination URL is the domain name of the region identified in step S1405. A domain attribute of the cookie with the digital signature of the JWT set therein is the same "xyz.com" as the login determination cookie 722, and is set to allow the authentication/authorization server 213 to also refer to it. The JWT is encrypted for the purpose of preventing tapping when the JWT is provided from the integrated entrance server 230 to the authentication/authorization server 213. Further, the JWT is send as the response and the digital signature of the JWT is stored in the cookie for the purpose of preventing the JWT and the digital signature of the JWT from ending up being replaced all together.

The web client 201 issues the login request to the received URL of the transition destination, i.e., the authentication/authorization server 213. At this time, in step S1408, the web client 201 transmits the JWT and the cookie with the digital signature of the JWT set therein that have been received in step S1407. The login request in step S1408 is directed to a different URL from step S707 illustrated in FIG. 7A according to the first exemplary embodiment, and the processing performed by the authentication/authorization server 213 is also different therefrom.

In step S1409, the authentication/authorization server 213 decrypts the received JWT using the common key. In step S1410, the authentication/authorization server 213 verifies the content of the JWT based on the signature by verifying the received digital signature with use of the public key of the integrated entrance server 230. If the content of the JWT is verified based on the signature, in step S1411, the authentication/authorization server 213 performs the login processing using the user ID and the password extracted from the JWT. Details of the login processing is as described above. In step S1412, as the response, the authentication/authorization server 213 sends the instruction for redirection to the URL of the menu page to which the web client 201 will be moved when the login is completed, and the instruction to set the authentication token and the identification information indicating that the user has logged in from the integrated entrance as the cookie information, similarly to step S709 illustrated in FIG. 7A. The processing after that is performed in a similar manner to steps S710 to S712 illustrated in FIG. 7A described in the first exemplary embodiment.

FIG. 15 illustrates an example of the JWT generated in step S1406. The JWT includes a header section, a payload section, and a digital signature section, and is structured in such a manner that a character string into which each of them is encoded with use of Base 64 is joined to one another with ".". According to the present exemplary embodiment, the domain name "https://www.xyz.com/" of the integrated entrance server 230 that has issued the JWT is set in iss (indicating an issuer) and sub (indicating a subject) in the payload of the JWT used. Next, the domain name "https://www-us.xyz.com/" of the authentication/authorization server 213 is set in and (indicating a user), and each of exp (an expiration date/time) and iat (an issue date and time) is set. Then, as a characteristic of the present exemplary embodiment, the value of the user ID and the value of the password are set in userID and password in the payload, respectively. In the example illustrated in FIG. 15, the login context is indicated as text data in the JSON (JavaScript (registered trademark) Object Notation) format, but is not limited to this format. Lastly, the integrated entrance server 230 encodes the header and the payload by Base 64, and adds the digital signature to this character string using the secret key of the integrated entrance server 230.

The authentication/authorization server 213 can verify that the information in the JWT is not tampered by verifying this digital signature value using the public key of the integrated entrance server 230. Further, as described with reference to FIG. 14, in step S1406, the header section and the payload section, and the digital signature section are separated from each other, and the header section and the payload section are provided to the web client 201 after being encrypted using the common key.

In this manner, even when the web browser is the old web browser unable to call the API using the script, the processing for the login from the integrated entrance server 230 can be performed. The first exemplary embodiment and the second exemplary embodiment can also be implemented in such a manner that these configurations coexist together. In the first exemplary embodiment and the second exemplary embodiment, the same URL in step S701 illustrated in FIG. 7A and step S1401 illustrated in FIG. 14 are specified respectively, and the login page in step S702 or the login page in step S1402 are send as the response. The first exemplary embodiment and the second exemplary embodiment are modified so that the common login page is send. Then, the client side determines which processing to execute, the processing according to the first exemplary embodiment or the processing according to the second exemplary embodiment, by the script written in the HTML of the login page. This configuration allows the first exemplary embodiment and the second exemplary embodiment to coexist together.

Figure 16:
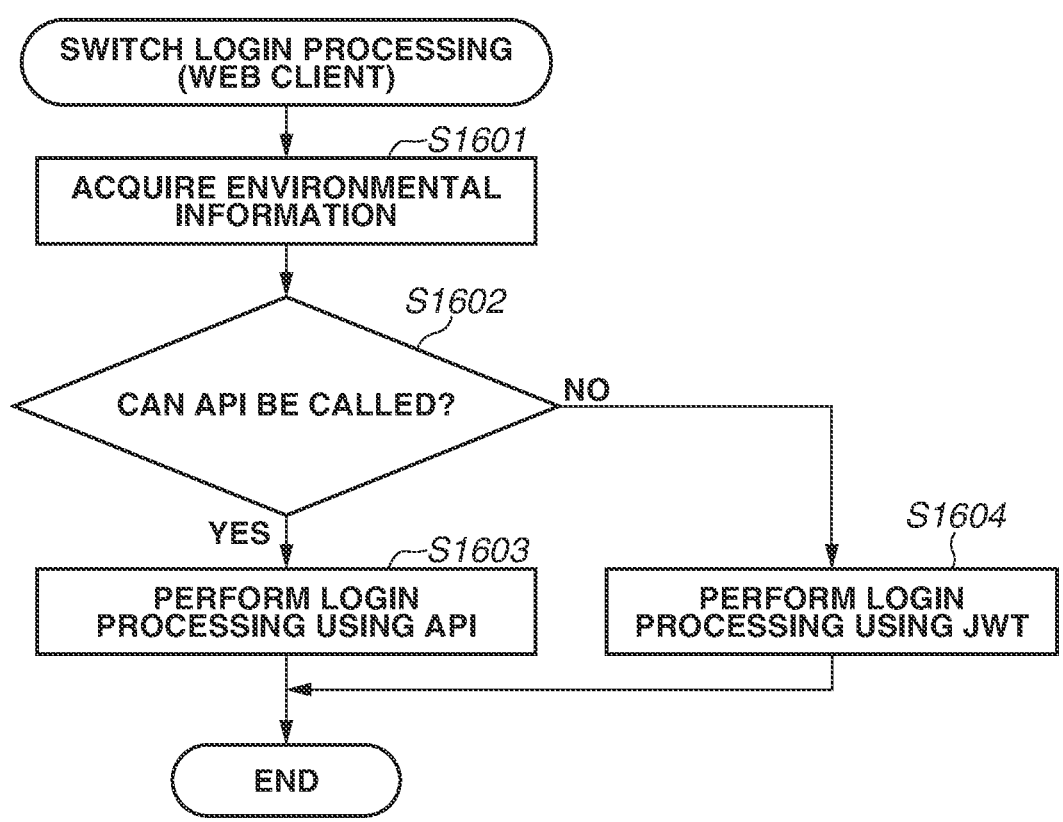
FIG. 16 is a flowchart illustrating switching of the login processing.

FIG. 16 is a flowchart illustrating the switching of the login processing. A program regarding the present flowchart is received as the script written in the HTML of the login page, and is read out into the memory 103 of the web client 201 and executed by the CPU 102. First, in step S1601, the web client 201 acquires environmental information. As the acquisition of the environmental information, for example, the window.navigator object is acquired by JavaScript. The window.navigator object contains information on the web browser, information on the operating system, and the like. In step S1602, the web client 201 checks the environmental information, and determines whether the API can be called on the client side. For the determination of whether the API can be called, the determination processing is also written in the script in advance, and the web client 201 determines it according to the determination processing of the script. Then, if the API can be called (YES in step S1602), in step S1603, the web client 201 performs the login processing using the API illustrated in FIG. 7A according to the first exemplary embodiment. If the API cannot be called (NO in step S1602), in step S1604, the web client 201 performs the login processing in step S1402 illustrated in FIG. 14 according to the second exemplary embodiment.

The first exemplary embodiment and the second exemplary embodiment are configured in such a manner that the authentication/authorization server 213 issues the authentication token, and the resource server 214 requests the verification of the authentication token to the authentication/authorization server 213, but may be implemented in such a manner that the authentication token is provided as digitally signed information. For example, the authentication/authorization server 213 issues the authentication token in the JWT format, and provides the authentication token after digitally signing it using its own secret key. The resource server 214 verifies the authentication token by verifying the signature using a public key of the authentication/authorization server 213 and checking a JWT payload section.

The present invention can also be realized by performing the following processing. That is, the present invention can also be realized by processing that supplies software (a program) capable of realizing the functions of the above-described exemplary embodiments to a system or an apparatus via a network or various kinds of storage media, and causes a computer (or a CPU, a micro processing unit (MPU), or the like) of this system or apparatus to read out and execute the program.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-230834, filed Nov. 30, 2017, which is hereby incorporated by reference herein in its entirety.

What is claimed is:

1. A system comprising:
a plurality of authentication servers each provided in a different one of regions;
an integrated entrance server configured to provide a login page; and
a client configured to include a web browser,
wherein the integrated entrance server includes one or more memories storing instructions and one or more processors that, upon execution of the instructions, are configured to operate as:
an identification unit configured to identify a region to which a user belongs, based on user information, in response to receipt of the user information input by the user via the login page from the web browser, and
a transmission unit configured to transmit information regarding the region identified by the identification unit to the web browser,
wherein the transmission unit transmits, in a case where the client is a device that cannot make an application programming interface (API) call, encrypted authentication information to which a digital signature is added in addition to the information regarding the region, the digital signature being created using a secret key corresponding to an authentication server to be accessed,
wherein the client includes one or more memories storing instructions and one or more processors that, upon execution of the instructions, are configured to operate as:
an access unit configured to access one authentication server among the plurality of authentication servers provided in the regions, respectively, based on the information transmitted by the transmission unit,
wherein the authentication server that has received the access by the access unit includes one or more memories storing instructions and one or more processors that, upon execution of the instructions, are configured to operate as:
an authentication unit configured to authenticate the user based on user authentication information received along with the access in a case where a login request is made via a login API, and authenticate the user based on decrypted user authentication information in response to a success in signature verification of the digital signature in a case where the login request is made in the encrypted authentication information, and
a setting unit configured to set an authentication token indicating that the user has logged in and identification information indicating that the user has logged in via the integrated entrance server into cookie information on the web browser in response to a success in the authentication of the user by the authentication unit, and
wherein a transition of the web browser in the system is controlled based on the cookie information on the web browser.

2. The system according to claim 1, wherein the control of the transition of the web browser includes control that is performed due to execution of any one of access to the integrated entrance server and access to a resource server provided in each of the regions.

3. The system according to claim 1, wherein the access by the access unit is performed by the web browser.

4. The system according to claim 1, wherein the one or more processors of the authentication server are further configured to operate as
a verification unit configured to receive the authentication token set in the cookie information on the web browser for the client from a resource server that has received the access by the client among a plurality of resource servers deployed in the regions, respectively, and verify the received authentication token.

5. The system according to claim 4,
wherein the one or more processors of the authentication server are further configured to operate as
a confirmation unit configured to confirm whether the user has logged in via the integrated entrance server based on the identification information set in the cookie information in response to receipt of access from the client following an instruction from the resource server due to occurrence of an error in the verification by the verification unit, and
an instruction unit configured to instruct the client to access the integrated entrance server in response to the confirmation unit confirming that the user has logged in via the integrated entrance server, and
wherein the integrated entrance server provides the login page to the web browser of the client that has accessed the integrated entrance server by following the instruction by the instruction unit.

6. The system according to claim 5, wherein the instruction unit instructs the client to access the integrated entrance server and also invalidates the identification information set in the cookie information on the web browser.

7. The system according to claim 5, wherein the authentication server provides a login page of the authentication server to the web browser of the client in response to the confirmation unit confirming that the user has not logged in via the integrated entrance server.

8. The system according to claim 5, wherein the web browser includes a storage unit configured to store the user information input on the login page provided by the integrated entrance server, and
wherein, in such a state that the user information stored in the storage unit is input on the login page provided in response to the access to the integrated entrance server by following the instruction by the instruction unit, the web browser displaying the login page.

9. The system according to claim 1,
wherein the transmission unit transmits encrypted user information, a digital signature, and a URL of the authentication server that the client should access in a case where it is confirmed that the web browser cannot call an API regarding the authentication based on environmental information on the client,
wherein the access unit accesses the authentication server indicated by the URL and also transmits the user information and the digital signature, and
wherein the authentication unit authenticates the user based on the encrypted user information in response to a success in verification of the digital signature.

10. A method for controlling a system including a plurality of authentication servers each provided in a different one of regions, an integrated entrance server configured to provide a login page, and a client including a web browser, the method comprising:

in the integrated entrance server,
identifying a region to which a user belongs, based on user information, according to receipt of the user information input by the user via the login page from the web browser;
transmitting information regarding the identified region to the web browser, and
transmitting, in a case where the client is a device that cannot make an application programming interface (API) call, encrypted authentication information to which a digital signature is added in addition to the information regarding the region, the digital signature being created using a secret key corresponding to an authentication server to be accessed;

in the client,
accessing one authentication server among the plurality of authentication servers each provided in a different one of the regions based on the transmitted information;

in the authentication server that has received the access from the client,
authenticating the user based on user authentication information received along with the access in a case where a login request is made via a login API, and authenticate the user based on decrypted user authentication information in response to a success in signature verification of the digital signature in a case where the login request is made in the encrypted authentication information;

setting an authentication token indicating that the user has logged in and identification information indicating that the user has logged in via the integrated entrance server into cookie information on the web browser in response to a success in authentication of the user; and controlling a transition of the web browser in the system based on the cookie information on the web browser.

* * * * *